United States Patent
Kuo et al.

(10) Patent No.: US 12,536,404 B2
(45) Date of Patent: Jan. 27, 2026

(54) DATA OPTIMIZATION FOR HIGH BANDWIDTH (HBW) NVM AI INFERENCE SYSTEM

(71) Applicant: MACRONIX INTERNATIONAL CO., LTD., Hsinchu (TW)

(72) Inventors: I-Ting Kuo, Taoyuan (TW); Hsiang-Lan Lung, Ardsley, NY (US)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 548 days.

(21) Appl. No.: 18/112,827

(22) Filed: Feb. 22, 2023

(65) Prior Publication Data
US 2024/0281636 A1    Aug. 22, 2024

(51) Int. Cl.
*G06N 3/04*    (2023.01)
*G06N 3/063*   (2023.01)

(52) U.S. Cl.
CPC .............. *G06N 3/04* (2013.01); *G06N 3/063* (2013.01)

(58) Field of Classification Search
CPC ................................. G06N 3/04; G06N 3/063
USPC ........................................................... 706/15
See application file for complete search history.

(56) References Cited

U.S. PATENT DOCUMENTS

| | | | |
|---|---|---|---|
| 4,219,829 A | 8/1980 | Dorda et al. |
| 4,987,090 A | 1/1991 | Hsu et al. |
| 5,029,130 A | 7/1991 | Yeh |
| 5,586,073 A | 12/1996 | Hiura et al. |
| 5,963,803 A | 10/1999 | Dawson et al. |
| 6,034,882 A | 3/2000 | Johnson et al. |
| 6,107,882 A | 8/2000 | Gabara et al. |
| 6,313,486 B1 | 11/2001 | Kencke et al. |
| 6,385,097 B1 | 5/2002 | Liao et al. |
| 6,486,027 B1 | 11/2002 | Noble et al. |

(Continued)

FOREIGN PATENT DOCUMENTS

| | | | |
|---|---|---|---|
| CN | 101432821 A | 5/2009 |
| CN | 1998012 B | 11/2010 |

(Continued)

OTHER PUBLICATIONS

Park et al., "FPGA based implementation of deep neural networks using on-chip memory only", ICASSP2016, 2016 (Year: 2016).*

(Continued)

*Primary Examiner* — Tsu-Chang Lee
(74) *Attorney, Agent, or Firm* — Paul Durdik; Haynes Beffel & Wolfeld LLP

(57) ABSTRACT

A method for storing weight data used to compute node values during inferencing operations conducted by a neural network comprises receiving a neural network definition. The neural network definition defines a neural network having a plurality of layers, each having a plurality of nodes. A set of weights used to compute a neural network inferencing result for each neural network node of the plurality of network nodes in the layer is determined. The set of weights determined for the layer in a page of memory can be stored in a high bandwidth non-volatile memory (NVM), such that any weights used to compute the neural network inference result for each neural network node of the plurality of nodes in the layer are stored together in the page of memory for retrieval together. Weights can be stored in different arrays across multiple memory channels.

21 Claims, 9 Drawing Sheets

(56) References Cited

U.S. PATENT DOCUMENTS

| | | |
|---|---|---|
| 6,593,624 B2 | 7/2003 | Walker |
| 6,829,598 B2 | 12/2004 | Milev |
| 6,856,542 B2 | 2/2005 | Roy et al. |
| 6,906,940 B1 | 6/2005 | Lue |
| 6,960,499 B2 | 11/2005 | Nandakumar et al. |
| 7,081,377 B2 | 7/2006 | Cleeves |
| 7,089,218 B1 | 8/2006 | Visel |
| 7,129,538 B2 | 10/2006 | Lee et al. |
| 7,177,169 B2 | 2/2007 | Scheuerlein |
| 7,368,358 B2 | 5/2008 | Ouyang et al. |
| 7,436,723 B2 | 10/2008 | Rinerson et al. |
| 7,593,908 B2 | 9/2009 | Abdulkader et al. |
| 7,646,041 B2 | 1/2010 | Chae et al. |
| 7,747,668 B2 | 6/2010 | Nomura et al. |
| 7,948,024 B2 | 5/2011 | Kim et al. |
| 8,045,355 B2 | 10/2011 | Jeda |
| 8,154,128 B2 | 4/2012 | Lung |
| 8,203,187 B2 | 6/2012 | Lung et al. |
| 8,275,728 B2 | 9/2012 | Pino |
| 8,331,149 B2 | 12/2012 | Choi et al. |
| 8,432,719 B2 | 4/2013 | Lue |
| 8,564,045 B2 | 10/2013 | Liu |
| 8,589,320 B2 | 11/2013 | Breitwisch et al. |
| 8,630,114 B2 | 1/2014 | Lue |
| 8,725,670 B2 | 5/2014 | Visel |
| 8,860,124 B2 | 10/2014 | Lue et al. |
| 9,064,903 B2 | 6/2015 | Mitchell et al. |
| 9,111,617 B2 | 8/2015 | Shim et al. |
| 9,147,468 B1 | 9/2015 | Lue |
| 9,177,966 B1 | 11/2015 | Rabkin et al. |
| 9,213,936 B2 | 12/2015 | Visel |
| 9,379,129 B1 | 6/2016 | Lue et al. |
| 9,391,084 B2 | 7/2016 | Lue |
| 9,397,110 B2 | 7/2016 | Lue |
| 9,401,371 B1 | 7/2016 | Lee et al. |
| 9,430,735 B1 | 8/2016 | Vali et al. |
| 9,431,099 B2 | 8/2016 | Lee et al. |
| 9,520,485 B2 | 12/2016 | Lue |
| 9,524,980 B2 | 12/2016 | Lue |
| 9,535,831 B2 | 1/2017 | Jayasena et al. |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2 | 8/2017 | Han et al. |
| 9,754,953 B2 | 9/2017 | Tang et al. |
| 9,767,028 B2 | 9/2017 | Cheng et al. |
| 9,898,207 B2 | 2/2018 | Kim et al. |
| 9,910,605 B2 | 3/2018 | Jayasena et al. |
| 9,922,716 B2 | 3/2018 | Hsiung et al. |
| 9,978,454 B2 | 5/2018 | Jung |
| 9,983,829 B2 | 5/2018 | Ravimohan et al. |
| 9,991,007 B2 | 6/2018 | Lee et al. |
| 10,037,167 B2 | 7/2018 | Kwon et al. |
| 10,043,819 B1 | 8/2018 | Lai et al. |
| 10,056,149 B2 | 8/2018 | Yamada et al. |
| 10,073,733 B1 | 9/2018 | Jain et al. |
| 10,157,012 B2 | 12/2018 | Kelner et al. |
| 10,175,667 B2 | 1/2019 | Bang et al. |
| 10,211,218 B2 | 2/2019 | Lue |
| 10,242,737 B1 | 3/2019 | Lin et al. |
| 10,381,376 B1 | 8/2019 | Nishikawa et al. |
| 10,403,637 B2 | 9/2019 | Lue |
| 10,528,643 B1 | 1/2020 | Choi et al. |
| 10,534,840 B1 | 1/2020 | Petti |
| 10,540,591 B2 | 1/2020 | Gao et al. |
| 10,552,759 B2 | 2/2020 | Rich |
| 10,565,494 B2 | 2/2020 | Henry et al. |
| 10,635,398 B2 | 4/2020 | Lin et al. |
| 10,643,713 B1 | 5/2020 | Louie et al. |
| 10,719,296 B2 | 7/2020 | Lee et al. |
| 10,777,566 B2 | 9/2020 | Lue |
| 10,783,963 B1 | 9/2020 | Hung et al. |
| 10,790,023 B2 | 9/2020 | Harari |
| 10,790,828 B1 | 9/2020 | Gunter et al. |
| 10,825,510 B2 | 11/2020 | Jaiswal et al. |
| 10,860,682 B2 | 12/2020 | Knag et al. |
| 10,880,994 B2 | 12/2020 | Aoki et al. |
| 10,910,393 B2 | 2/2021 | Lai et al. |
| 10,942,673 B2 | 3/2021 | Shafiee Ardestani et al. |
| 10,957,392 B2 | 3/2021 | Lee et al. |
| 10,963,780 B2 | 3/2021 | Nowatzyk et al. |
| 10,970,911 B2 | 4/2021 | Schied et al. |
| 11,069,704 B2 | 7/2021 | Lai et al. |
| 11,127,108 B2 | 9/2021 | Sharma et al. |
| 11,171,115 B2 | 11/2021 | Manipatruni et al. |
| 11,410,028 B2 | 8/2022 | Crill et al. |
| 11,443,407 B2 | 9/2022 | Sharma et al. |
| 11,550,158 B2 | 1/2023 | Pendse |
| 11,694,940 B1 | 7/2023 | Mathuriya et al. |
| 11,704,211 B1 | 7/2023 | Kaplan et al. |
| 12,086,410 B1 | 9/2024 | Mathuriya et al. |
| 2001/0055838 A1 | 12/2001 | Walker et al. |
| 2002/0028541 A1 | 3/2002 | Lee et al. |
| 2003/0122181 A1 | 7/2003 | Wu |
| 2005/0088878 A1 | 4/2005 | Eshel |
| 2005/0280061 A1 | 12/2005 | Lee |
| 2005/0287793 A1 | 12/2005 | Blanchet et al. |
| 2007/0158736 A1 | 7/2007 | Arai et al. |
| 2008/0101109 A1 | 5/2008 | Haring-Bolivar et al. |
| 2008/0117678 A1 | 5/2008 | Shieh et al. |
| 2009/0097321 A1 | 4/2009 | Kim et al. |
| 2009/0184360 A1 | 7/2009 | Jin et al. |
| 2010/0172189 A1 | 7/2010 | Itagaki et al. |
| 2010/0182828 A1 | 7/2010 | Shima et al. |
| 2010/0202208 A1 | 8/2010 | Endo et al. |
| 2010/0270593 A1 | 10/2010 | Lung et al. |
| 2011/0018051 A1 | 1/2011 | Kim et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0140070 A1 | 6/2011 | Kim |
| 2011/0194357 A1 | 8/2011 | Han et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0112264 A1 | 5/2012 | Lee et al. |
| 2012/0182801 A1 | 7/2012 | Lue |
| 2012/0235111 A1 | 9/2012 | Osano et al. |
| 2012/0254087 A1 | 10/2012 | Visel |
| 2013/0070528 A1 | 3/2013 | Maeda |
| 2013/0075684 A1 | 3/2013 | Kinoshita et al. |
| 2013/0119455 A1 | 5/2013 | Chen et al. |
| 2014/0043898 A1 | 2/2014 | Kuo et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1 | 11/2014 | Visel |
| 2015/0008500 A1 | 1/2015 | Fukumoto et al. |
| 2015/0170001 A1 | 6/2015 | Rabinovich et al. |
| 2015/0171106 A1 | 6/2015 | Suh |
| 2015/0179661 A1 | 6/2015 | Huo et al. |
| 2015/0199126 A1 | 7/2015 | Jayasena et al. |
| 2015/0331817 A1 | 11/2015 | Han et al. |
| 2015/0340369 A1 | 11/2015 | Lue |
| 2016/0043100 A1 | 2/2016 | Lee et al. |
| 2016/0141299 A1 | 5/2016 | Hong |
| 2016/0141337 A1 | 5/2016 | Shimabukuro et al. |
| 2016/0181315 A1 | 6/2016 | Lee et al. |
| 2016/0232973 A1 | 8/2016 | Jung |
| 2016/0247579 A1 | 8/2016 | Ueda et al. |
| 2016/0308114 A1 | 10/2016 | Kim et al. |
| 2016/0329341 A1 | 11/2016 | Shimabukuro et al. |
| 2016/0336064 A1 | 11/2016 | Seo et al. |
| 2016/0342892 A1 | 11/2016 | Ross |
| 2016/0342893 A1 | 11/2016 | Ross et al. |
| 2016/0343421 A1 | 11/2016 | Pyo |
| 2016/0358661 A1 | 12/2016 | Vali et al. |
| 2016/0379115 A1 | 12/2016 | Burger et al. |
| 2017/0003889 A1 | 1/2017 | Kim et al. |
| 2017/0025421 A1 | 1/2017 | Sakakibara et al. |

(56) References Cited

U.S. PATENT DOCUMENTS

| | | |
|---|---|---|
| 2017/0084748 A1 | 3/2017 | Yang |
| 2017/0091313 A1* | 3/2017 | Chalabi .................. G06F 16/958 |
| 2017/0092370 A1 | 3/2017 | Harari |
| 2017/0103316 A1 | 4/2017 | Ross et al. |
| 2017/0123987 A1 | 5/2017 | Cheng et al. |
| 2017/0148517 A1 | 5/2017 | Harari |
| 2017/0160955 A1 | 6/2017 | Jayasena et al. |
| 2017/0169885 A1 | 6/2017 | Tang et al. |
| 2017/0169887 A1 | 6/2017 | Widjaja |
| 2017/0243879 A1 | 8/2017 | Yu et al. |
| 2017/0263623 A1 | 9/2017 | Zhang et al. |
| 2017/0270405 A1 | 9/2017 | Kurokawa |
| 2017/0287928 A1 | 10/2017 | Kanamori et al. |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1 | 11/2017 | Bayat et al. |
| 2018/0113649 A1 | 4/2018 | Shafiee Ardestani et al. |
| 2018/0121790 A1 | 5/2018 | Kim et al. |
| 2018/0129424 A1 | 5/2018 | Confalonieri et al. |
| 2018/0129936 A1 | 5/2018 | Young et al. |
| 2018/0144240 A1 | 5/2018 | Garbin et al. |
| 2018/0157488 A1 | 6/2018 | Shu et al. |
| 2018/0173420 A1 | 6/2018 | Li et al. |
| 2018/0182776 A1 | 6/2018 | Kim |
| 2018/0189640 A1 | 7/2018 | Henry et al. |
| 2018/0240522 A1 | 8/2018 | Jung |
| 2018/0246783 A1 | 8/2018 | Avraham et al. |
| 2018/0247195 A1 | 8/2018 | Kumar et al. |
| 2018/0285726 A1 | 10/2018 | Baum et al. |
| 2018/0286874 A1 | 10/2018 | Kim et al. |
| 2018/0321942 A1 | 11/2018 | Yu et al. |
| 2018/0342299 A1 | 11/2018 | Yamada et al. |
| 2018/0350823 A1 | 12/2018 | Or-Bach et al. |
| 2019/0019538 A1 | 1/2019 | Li et al. |
| 2019/0019564 A1 | 1/2019 | Li et al. |
| 2019/0035449 A1 | 1/2019 | Saida et al. |
| 2019/0043560 A1 | 2/2019 | Sumbul et al. |
| 2019/0050714 A1 | 2/2019 | Nosko et al. |
| 2019/0065151 A1 | 2/2019 | Chen et al. |
| 2019/0073564 A1 | 3/2019 | Saliou |
| 2019/0073565 A1 | 3/2019 | Saliou |
| 2019/0088329 A1 | 3/2019 | Tiwari et al. |
| 2019/0102170 A1 | 4/2019 | Chen et al. |
| 2019/0138891 A1 | 5/2019 | Kim et al. |
| 2019/0138892 A1 | 5/2019 | Kim et al. |
| 2019/0148393 A1 | 5/2019 | Lue |
| 2019/0164044 A1 | 5/2019 | Song et al. |
| 2019/0164617 A1 | 5/2019 | Tran et al. |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2019/0311243 A1 | 10/2019 | Whatmough et al. |
| 2019/0311749 A1 | 10/2019 | Song et al. |
| 2019/0325959 A1 | 10/2019 | Bhargava et al. |
| 2019/0340497 A1 | 11/2019 | Baraniuk et al. |
| 2019/0349426 A1 | 11/2019 | Smith et al. |
| 2019/0363131 A1 | 11/2019 | Torng et al. |
| 2020/0026993 A1 | 1/2020 | Otsuka |
| 2020/0034148 A1 | 1/2020 | Sumbul et al. |
| 2020/0065650 A1 | 2/2020 | Tran et al. |
| 2020/0098784 A1 | 3/2020 | Nagashima et al. |
| 2020/0098785 A1 | 3/2020 | Kaneko |
| 2020/0110990 A1 | 4/2020 | Harada et al. |
| 2020/0117986 A1 | 4/2020 | Burr et al. |
| 2020/0118638 A1 | 4/2020 | Leobandung et al. |
| 2020/0143248 A1 | 5/2020 | Liu et al. |
| 2020/0160165 A1 | 5/2020 | Sarin |
| 2020/0227432 A1 | 7/2020 | Lai et al. |
| 2020/0334015 A1 | 10/2020 | Shibata et al. |
| 2020/0343252 A1 | 10/2020 | Lai et al. |
| 2020/0349093 A1 | 11/2020 | Malladi et al. |
| 2020/0365611 A1 | 11/2020 | Hung et al. |
| 2020/0381450 A1 | 12/2020 | Lue et al. |
| 2020/0395309 A1 | 12/2020 | Cheah et al. |
| 2020/0402997 A1 | 12/2020 | Ahn et al. |
| 2021/0125042 A1 | 4/2021 | Han |
| 2021/0157737 A1* | 5/2021 | Gu .................. G06F 9/3877 |
| 2021/0168230 A1 | 6/2021 | Baker et al. |
| 2021/0209468 A1 | 7/2021 | Matsumoto et al. |
| 2021/0240945 A1 | 8/2021 | Strachan et al. |
| 2022/0231687 A1 | 7/2022 | Dabral et al. |
| 2022/0284657 A1 | 9/2022 | Müller et al. |
| 2023/0059491 A1 | 2/2023 | Dokania et al. |
| 2023/0101654 A1 | 3/2023 | Nava Rodriguez et al. |
| 2023/0153587 A1 | 5/2023 | Vogelsang et al. |
| 2024/0064044 A1 | 2/2024 | Liu |

FOREIGN PATENT DOCUMENTS

| | | |
|---|---|---|
| CN | 103778468 A | 5/2014 |
| CN | 105718994 A | 6/2016 |
| CN | 105789139 A | 7/2016 |
| CN | 106530210 A | 3/2017 |
| CN | 106815515 A | 6/2017 |
| CN | 107077879 A | 8/2017 |
| CN | 107368892 A | 11/2017 |
| CN | 107533459 A | 1/2018 |
| CN | 107767905 A | 3/2018 |
| CN | 108268946 A | 7/2018 |
| CN | 110598752 A | 12/2019 |
| EP | 2048709 A2 | 4/2009 |
| JP | H0451382 A | 2/1992 |
| JP | 2006127623 A | 5/2006 |
| JP | 2009080892 A | 4/2009 |
| TW | 201108230 A | 3/2011 |
| TW | 201523838 A | 6/2015 |
| TW | 201618284 A | 5/2016 |
| TW | 201639206 A | 11/2016 |
| TW | 201715525 A | 5/2017 |
| TW | 201732824 A | 9/2017 |
| TW | 201741943 A | 12/2017 |
| TW | 201802800 A | 1/2018 |
| TW | 201807807 A | 3/2018 |
| TW | 201822203 A | 6/2018 |
| TW | 201921297 A | 6/2019 |
| TW | 201939717 A | 10/2019 |
| TW | 202004573 A | 1/2020 |
| TW | 202011285 A | 3/2020 |
| TW | 202040505 A | 11/2020 |
| TW | 202046179 A | 12/2020 |
| TW | 202103307 A | 1/2021 |
| TW | 202122994 A | 6/2021 |
| TW | 202129509 A | 8/2021 |
| TW | 202219590 A | 5/2022 |
| WO | 2012009179 A1 | 1/2012 |
| WO | 2012015450 A1 | 2/2012 |
| WO | 2016060617 A1 | 4/2016 |
| WO | 2016084336 A1 | 6/2016 |
| WO | 2017091338 A1 | 6/2017 |
| WO | 2018201060 A1 | 11/2018 |

OTHER PUBLICATIONS

Goplen et al., "Placement of 3D ICs with Thermal and Interlayer Via Considerations," 2007 44th ACM/IEEE Design Automation Conference, Jun. 4-8, 2007, pp. 626-631.

Tanaka et al., "Through-Silicon via Interconnection for 3D Integration Using Room-Temperature Bonding," in IEEE Transactions on Advanced Packaging, vol. 32, No. 4, Nov. 2009, pp. 746-753.

Temiz, et al., "Post-CMOS Processing and 3-D Integration Based on Dry-Film Lithography," in IEEE Transactions on Components, Packaging and Manufacturing Technology, vol. 3, No. 9, Sep. 2013, pp. 1458-1466.

Li, et al., "On-chip memory technology design space explorations for mobile deep neural network accelerators," Proceedings of the 56th Annual Design Automation Conference, Jun. 2, 2029, pp. 1-6.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

(56) References Cited

OTHER PUBLICATIONS

Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2.
Anonymous, "Data in the Computer", May 11, 2015, pp. 1-8, https://web.archive.org/web/20150511143158/ https:// homepage.cs.uri .edu/faculty/wolfe/book/Readings/Reading02.htm (Year: 2015)—See Office Action dated Aug. 17, 2020 in U.S. Appl. No. 16/279,494 for relevance—no year provided.
Aritome, et al., "Reliability issues of flash memory cells," Proc. of the IEEE, vol. 81, No. 5, May 1993, pp. 776-788.
Beasley, "Manufacturing Defects," may be found at https://slideplayer.com/slide/11407304, downloaded May 20, 2020, 61 pages.
Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.
Chen et al., "Eyeriss: An Energy-Efficient reconfigurable accelerator for deep convolutional neural networks," IEEE Sscc, Jan. 31-Feb. 4, 2016, 3 pages.
Choi et al., "Performance Breakthrough in NOR Flash Memory with Dopant-Segregated Schottky-Barrier (DSSB) SONOS Device", 2009 Symposium onVLSI Technology Digest of Technical Papers, Jun. 16-18, 2009, pp. 1-2.
Entegris FAQ Series, "Contamination Control in Ultrapure Chemicals and Water: Fundamentals of Contamination Control," may be found at https://www.entegris.com/en/home/resources/technical-information/faq/contamination-control-in-ultrapure-chemicals-and-water.html., downloaded May 20, 2020, 10 pages.
Fukuzumi et al. "Optimal Integration and Characteristics of Vertical Array Devices for Ultra-High Density, Bit-Cost Scalable Flash Memory," IEEE Dec. 2007, pp. 449-452.
Gonugondla et al., "Energy-Efficient Deep In-memory Architecture for NAND Flash Memories," IEEE International Symposium on Circuits and Systems (ISCAS), May 27-30, 2018, 5 pages.
Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.
Hsu et al., "Study of Sub-30nm Thin Film Transistor (TFT) Charge-Trapping (CT) Devices for 3D Nand Flash Application", IEDM 2009 IEEE International, Dec. 7-9, 2009, p. 1-4.
Hubert et al., "A Stacked SONOS Technology, Up to 4 Levels and 6nm Crystalline Nanowires, With Gate-All-Around on Independent Gates (Flash), Suitable for Full 3D Integration," IEEE 2009, Dec. 7-9, 2009, pp. 27.6.1-27.6.4.
Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.
IMEC Magazine, Mar. 2018, 35 pages.
Jang et al., "Vertical Cell Array Using TCAT (Terabit Cell Array Transistor) Technology for Ultra High Density NAND Flash Memory," 2009 Symposium on VLSI Technology Digest of Technical Papers, Jun. 16-18, 2009, pp. 192-193.
Johnson et al., "512-Mb PROM With a Three-Dimensional Array of Diode/Antifuse Memory Cells," IEEE Journal of Solid-State Circuits, vol. 38, No. 11, Nov. 2003, pp. 1920-1928.
Jung et al., "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.
Katsumata et al., "Pipe-shaped BiCS flash memory with 16 stacked layers and multi-level-cell operation for ultra high density storage devices," 2009 Symp. on VLSI Technology, Jun. 16-18, 2009, 2 pages.
Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent).
Kim et al., "Multi-Layered Vertical Gate NAND Flash Overcoming Stacking Limit for Terabit Density Storage," 2009 Symposium on VLSI Technology Digest of Technical Papers, Jun. 16-18, 2009, pp. 188-189.
Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.
Kim et al., "Three-Dimensional NAND Flash Architecture Design Based on Single-Crystalline STacked ARray," IEEE Transactions on Electron Devices, vol. 59, No. 1, pp. 35-45, Jan. 2012.
Kim, "Abrasive for Chemical Mechanical Polishing. Abrasive Technology: Characteristics and Applications," Book Abrasive Technology: Characteristics and Applications, Mar. 2018, 20 pages.
Lai et al. "Highly Reliable MA BE-SONOS (Metal-Al2O3 Bandgap Engineered SONOS) Using a SiO2 Buffer Layer," VLSI Technology, Systems and Applications 2008, VLSI-TSA International Symposium on Apr. 21-23, 2008, pp. 58-59.
Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.
Liu et al., "Parallelizing SRAM Arrays with Customized Bit-Cell for Binary Neural Networks," 55th ACM/ESDA/IEEE Design Automation Conference (DAC), Sep. 20, 2018, 4 pages.
Lue et al., "A Highly Scalable 8-Layer 3D Vertical-Gate (VG) TFT Nand Flash Using Junction-Free Buried Channel BE-SONOS Device", 2010 Symposium on VLSI Technology Digest of Technical Papers, pp. 131-132, Jun. 15-17, 2010.
Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.
Lue et al., "A Novel Buried-Channel FinFET Be-Sonos Nand Flash with Improved Memory Window and Cycling Endurance", 2009 Symposium on VLSI Technology Digest of Technical Papers, p. 224-225.
Meena, et al., "Overview of emerging nonvolatile memory technologies," Nanoscale Reearch Letters 9:526, Oct. 2, 2014, 34 pages.
Merrikh-Bayat et al., "High-Performance Mixed-Signal Neurocomputing with Nanoscale Flowting-Gate Memory Cell Arrays," in IEEE Transactions on Neural Netowrks and Learning Systems, vol. 29, No. 10, Oct. 2018, pp. 4782-4790.
Minghao Qi, "ECE 695Q Lecture 10: Optical Lithography—Resolution Enhancement Techniques, " may be found at https://nanohub.org/resources/15325/watch?resid=24507, Spring 2016, 35 pages.
Nowak et al., "Intrinsic fluctuations in Vertical NAND flash memories," 2012 Symposium on VLSI Technology, Digest of Technical Papers, pp. 21-22, Jun. 12-14, 2012.
Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep. 1985, 8 pages.
Paul et al., "Impact of a Process Variation on Nanowire and Nanotube Device Performance", IEEE Transactions on Electron Devices, vol. 54, No. 9, Sep. 2007, p. 2369-2376.
Rincon-Mora, et al., "Bandgaps in the crosshairs: What's the trim target?" IEEE, The Georgia Tech Analog & Power IC abroator, Oct. 18, 2006, 5 pages.
Rod Nussbaumer, "How is data transmitted through wires in the computer?", Aug. 27, 2015, pp. 1-3, https://www.quora.com/ How-is-data-transmitted-through-wires-in-the-computer (Year: 2015)—See Office Action dated Aug. 17, 2020 in U.S. Appl. No. 16/279,494 for relevance—no year provided.
Sakai et al., "A Buried Giga-Ohm Resistor (BGR) Load Static RAM Cell," IEEE Symp. on VLSI Technology, Digest of Papers, Sep. 10-12, 1984, 2 pages.

(56) References Cited

OTHER PUBLICATIONS

Schuller et al., " Neuromorphic Computing: From Materials to Systems Architecture," US Dept. of Energy, Oct. 29-30, 2015, Gaithersburg, MD, 40 pages.
Scott Thornton, "What is DRAm (Dynamic Random Access Memory) vs SRAM?", Jun. 22, 2017, pp. 1-11, https://www.microcontrollertips.com/dram-vs-sram/ (Year: 2017)—See Office Action dated Aug. 17, 2020 in U.S. Appl. No. 16/279,494 for relevance—no year provided.
Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.
Soudry, et al. "Hebbian learning rules with memristors," Center for Communication and Information Technologies CCIT Report #840, Sep. 1, 2013, 16 pages.
Tanaka et al., "Bit Cost Scalable Technology with Punch and Plug Process for Ultra High Density Flash Memory," VLSI Technology, 2007 IEEE Symposium on Jun. 12-14, 2007, pp. 14-15.
The Nikon eReview, "KLA-Tencor Research Scientist Emphasizes Stochastic Challenges at LithoVision 2018," may be found at https://nikonereview.com/2018/kla-tencor-research-scientist-emphasizes-stochastic-challenges-at-lithovision-Spring 2018, 7 pages.
Wang et al., "Three-Dimensional NAND Flash for Vector-Matrix Multiplication," IEEE Trans. on Very Large Scale Integration Systems (VLSI), vol. 27, No. 4, Apr. 2019, 4 pages.
Wang, Michael, "Technology Trends on 3D-NAND Flash Storage", Impact 2011, Taipei, dated Oct. 20, 2011, found at www.impact.org.tw/2011/Files/NewsFile/201111110190.pdf.
Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided.
Webopedia, "SoC", Oct. 5, 2011, pp. 1-2, https://web.archive.org/web/20111005173630/https://www.webopedia.com/ TERM/S/SoC.html (Year: 2011)—See Office Action dated Aug. 17, 2020 in U.S. Appl. No. 16/279,494 for relevance—no month provided.
Webopedia, "volatile memory", Oct. 9, 2017, pp. 1-4, https://web.archive.org/web/20171009201852/https://www.webopedia.com/TERMN/volatile_memory.html (Year: 2017)—See Office Action dated Aug. 17, 2020 in U.S. Appl. No. 16/279,494 for relevance—no year provided.

\* cited by examiner

DATA OPTIMIZATION FOR HIGH BANDWIDTH (HBW) NVM AI INFERENCE SYSTEM

RELATED APPLICATION

This application is being filed concurrently with commonly owned, commonly invented U.S. patent application Ser. No. 18/112,784 (now U.S. Pat. No. 12,321,603) titled "HIGH BANDWIDTH NON-VOLATILE MEMORY FOR AI INFERENCE SYSTEM", which is incorporated in its entirety herein for all purpose.

BACKGROUND

Field

The present technology relates to integrated circuit memory devices, such as non-volatile memory devices, that support storage and retrieval of information used in artificial intelligence (AI) inferencing applications, and particularly relates to approaches for the storage and retrieval of AI inferencing (weight) data that fully leverage the greater bandwidth capabilities of AI memory architectures.

Description of Related Art

Modern information technology applications, such as artificial intelligence (AI) inferencing can consume copious amounts of data such as weighting information in conduct of inferencing operations.

Many different types of memory architectures have been created, each providing storage of digital data and addressing different needs and requirements of a variety of applications. However, conventional approaches to memory devices often suffer from insufficient bandwidth, leading to poor performance, or require refresh logic and are therefore higher in cost.

Numerous reads/writes especially in AI applications, where there can be hundreds of millions of reads/writes, consume a great deal of power and require significant processing time. Therefore, a need arises for an AI inference platform that has higher bandwidth and lower power consumption by reducing the read/write time and the number of read/write operations.

It is desirable to provide mechanisms for the storage and retrieval of AI inferencing (weight) data that fully leverage the greater bandwidth capabilities of AI memory architectures.

SUMMARY

The present technology provides for storing weight data used to compute node values during inferencing operations on a neural network enabling a reduced number of read operations and associated read times and reduced power consumption. Such operations may be conducted by an artificial intelligence (AI) accelerator processing core or cores (e.g., accelerator core) of an AI inference platform coupled with a NAND flash or other high bandwidth memory architecture. The method can be implemented in logic disposed within an AI inference memory device or in a nonvolatile storage coupled to a neural processing unit (NPU) of an AI inference platform employing a high bandwidth (HBW) NAND flash technology as well as other HBW types.

In a representative implementation and by way of example, a method for storing weight data used to compute node values during inferencing operations conducted by a neural network comprises receiving by an AI accelerator of an artificial intelligence inferencing platform, a neural network definition. The neural network definition defines a neural network having a plurality of layers. A layer comprises a plurality of neural network nodes. A neural network node uses one or more weights to compute a result for the node by applying a function to (i) the one or more weights and (ii) an input to the node during an inferencing operation. Determining for a layer of the plurality of layers defined in the neural network definition, a set of weights to use to compute a neural network inferencing result for each neural network node of the plurality of network nodes in the layer is also part of the method. The set of weights determined for the layer in a page of memory can be stored in a high bandwidth NVM such that any weights of the set of weights used to compute the neural network inference result for each neural network node of the plurality of nodes in the layer are stored together in the page of memory for retrieval together.

In another example implementation, the method further includes processing a next layer in the neural network definition, such that a second set of weights used to compute a neural network inference result for the next layer are also stored together in the page of memory for retrieval together.

In a further implementation, weights in the set of weights can be assigned to groups of weights and each group of weights is assigned to a channel in the neural network definition. Weights of a particular channel can be stored together such that weights of two or more groups of weights used to compute the neural network inference result for each neural network node of the plurality of nodes in the layer are retrieved sequentially without necessitating a read of an additional page of memory.

In a yet further implementation, retrieving the weights of the two or more groups of weights can include retrieving all groups for the layer without necessitating a read of an additional page of memory.

In a still further implementation, each group of weights corresponds to a particular channel of the neural network. For example, a neural network configured to process images can include channels for red (R), green (G), and blue (B).

In a yet still further implementation, each channel of the neural network corresponds to a filter populated by the weights of a respective group of weights. For example, filters of each corresponding channel can comprise weights arranged in a pattern selected from a 3×3 pattern, a 4×4 pattern, a 5×5 pattern, and a 6×6 pattern.

In a yet still further implementation, weights are stored to and read from one or more dies implementing non-volatile storage arrays using a plurality of memory channels, which provide pathways for data transfer to and from the NVM dies. For example, all of the weights belonging to a group can be allocated to a particular memory channel. In another example, weights belonging to a group are apportioned among multiple memory channels.

In a yet still further implementation, each weight in the set of weights can be retrieved from a previous storage location in memory prior to storing the set of weights determined for a layer in a page of memory; thereby re-arranging weight data in the memory.

In another representative implementation providing further example, an artificial intelligence (AI) inference memory device comprises a plurality of non-volatile memory (NVM) dies, each of the NVM dies including at least one memory array and a plurality of connections to corresponding channel logic to provide storage into and retrieval from the memory array. The NVM dies can be operatively coupled with a neural processing unit (NPU) implementing an accelerator core connected via the corresponding channel logic for conducting data to and from the memory arrays and configured to implement the described methods for storing weight data used to compute node values during artificial intelligence (AI) inferencing operations conducted by a neural network.

In a further representative implementation providing a further example, an AI inference system comprises a plurality of non-volatile memory (NVM) dies, each of the NVM dies including at least one memory array and a plurality of connections to corresponding channel logic to provide storage into and retrieval from the memory array. The AI inferencing system can further include a neural processing unit (NPU) implementing an accelerator core connected via the corresponding channel logic for conducting data to and from the memory arrays and configured to implement the described methods for storing weight data used to compute node values during artificial intelligence (AI) inferencing operations conducted by a neural network. These components can be disposed on a common interposer or substrate or distributed among multiple packages.

In a still further representative implementation providing a further example, a non-transitory memory is provided that stores instructions for storing weight data used to compute node values during artificial intelligence (AI) inferencing operations conducted by a neural network, which when, executed by one or more processors implement the described actions for receiving a neural network definition, determining for a layer of a plurality of layers defined in the neural network definition, a set of weights to use to compute a neural network inferencing result for each neural network node of the plurality of network nodes in the layer, and storing weight data used to compute node values during artificial intelligence (AI) inferencing operations conducted by a neural network.

Weight data storage paradigms in accordance with embodiments described herein can reduce flash access times and increase data process efficiency. Other aspects and advantages of the present technology can be seen on review of the drawings, the detailed description and the claims, which follow.

DETAILED DESCRIPTION

A detailed description of embodiments of the present technology is provided with reference to the FIGS. 1-11. Implementations as described herein embody a data optimization processes in methods, and hardware logic for use in storing weight data used in artificial intelligence (AI) inferencing operations to reduce data fetching required during reading of weight data to populate the neural network nodes and to thereby increase data throughput and AI inferencing process efficiencies.

In a typical AI inferencing platform configuration, an AI accelerator will fetch weight data to be used during AI inferencing from a high bandwidth (HBW) non-volatile memory (NVM) or HBW NAND. During such reading operations, NAND flash for example permits access granularity at the page level. Data fetching can become impaired when data is stored in different pages, requiring multiple page-fetching operations to obtain weight data for nodes of a neural network layer being populated. This can impact the processing throughput and/or speed of the overall process. In a critical case, the AI accelerator may even stall and wait for incoming data to arrive. Accordingly, implementations as described herein embody a data optimization processes in methods, and hardware logic to reduce data fetching required and increase data throughput and AI inferencing process efficiencies.

In process constrained environments, speed in which the AI application arrives at a result becomes an important factor. Thus conventional randomly stored weight data in the HBW NAND flash could increase data fetching operations required and lead to low data transmission efficiency due to the page-level granularity inherent to NAND flash page read operations. Weight data storage paradigms in accordance with embodiments described herein can reduce flash access times and increase data process efficiency.

Figure 1:
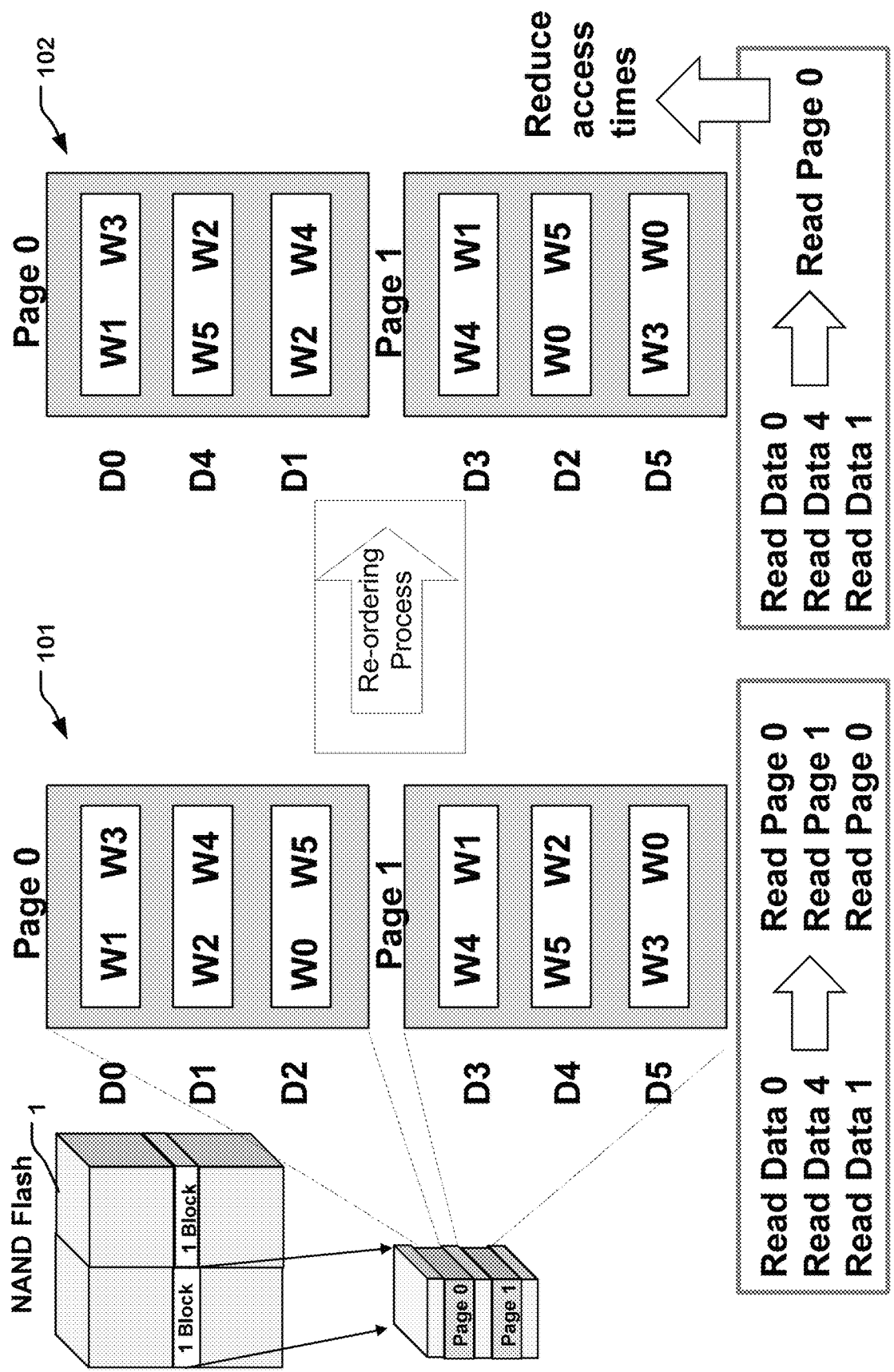
FIG. 1 is a simplified diagram illustrating storage and retrieval of weight data in a memory system including a flash memory device implemented on an integrated circuit as described herein.

FIG. 1 is a simplified diagram illustrating storage and retrieval of weight data used to compute node values during inferencing operations conducted by a neural network in a memory system including a flash memory device 1 implemented on an integrated circuit as described herein. The memory device can be implemented on a single integrated circuit chip, on a multichip module, or on a plurality of chips configured to suit a particular need.

As shown in FIG. 1, memory device 1 is a NAND flash in which read operations are performed at a one-page granularity, meaning that every time a fetch operation for data is performed, one whole page must be read from the flash. Data fetching can become slow when data is stored in different pages. This may impact the process speed of the entire AI inferencing platform. Further, the AI accelerator may stall and wait for data to arrive. This can result in low bandwidth utilization if locality of the data is not well preserved.

Continuing with FIG. 1, D0 to D5 indicate data storage locations; W0 to W5 indicate weight data. The weight data was stored in the NVM. In a first scenario 101, weight data (i.e., neural network weights) are stored randomly in data locations from location D0 to location D5 in page 0 and page 1. Accordingly, if neural network processing calls for weights W1, W5 and W2 to perform a calculation, i.e., obtain a node value or set of node values, then the NAND flash memory device 1 will read page 0 first, in order to obtain weight W1, then read page 1, in order to obtain weight W5, and then go back to re-read page 0, in order to obtain weight W2. However, if the data is stored in data locations in accordance with an expected retrieval indicated by the neural network to be processed, or re-ordered to be in such storage locations, as illustrated by second scenario 102, expected data acquisition times can be reduced. In second scenario 102, weights W1, W5 and W2 are all stored in locations in page 0. Thus, obtaining weights W1, W5 and W2 calls for the NAND flash memory device 1 to perform a single read of page 0, which reduces access time, increases efficiency, increases performance, etc. In various implementations, the structure of the neural network, which indicates which weights are to be used and in what order, can be received as an input by the AI inferencing system, read from storage, or otherwise made accessible. Because the whole neural network structure can be obtained from a local storage on chip, received from a host or another chip in the AI inferencing system, the AI inferencing system can determine what weight data needs to be input during AI inference, and thus in what order the weight data can be stored in order to reduce access times during later inferencing.

Figure 2:
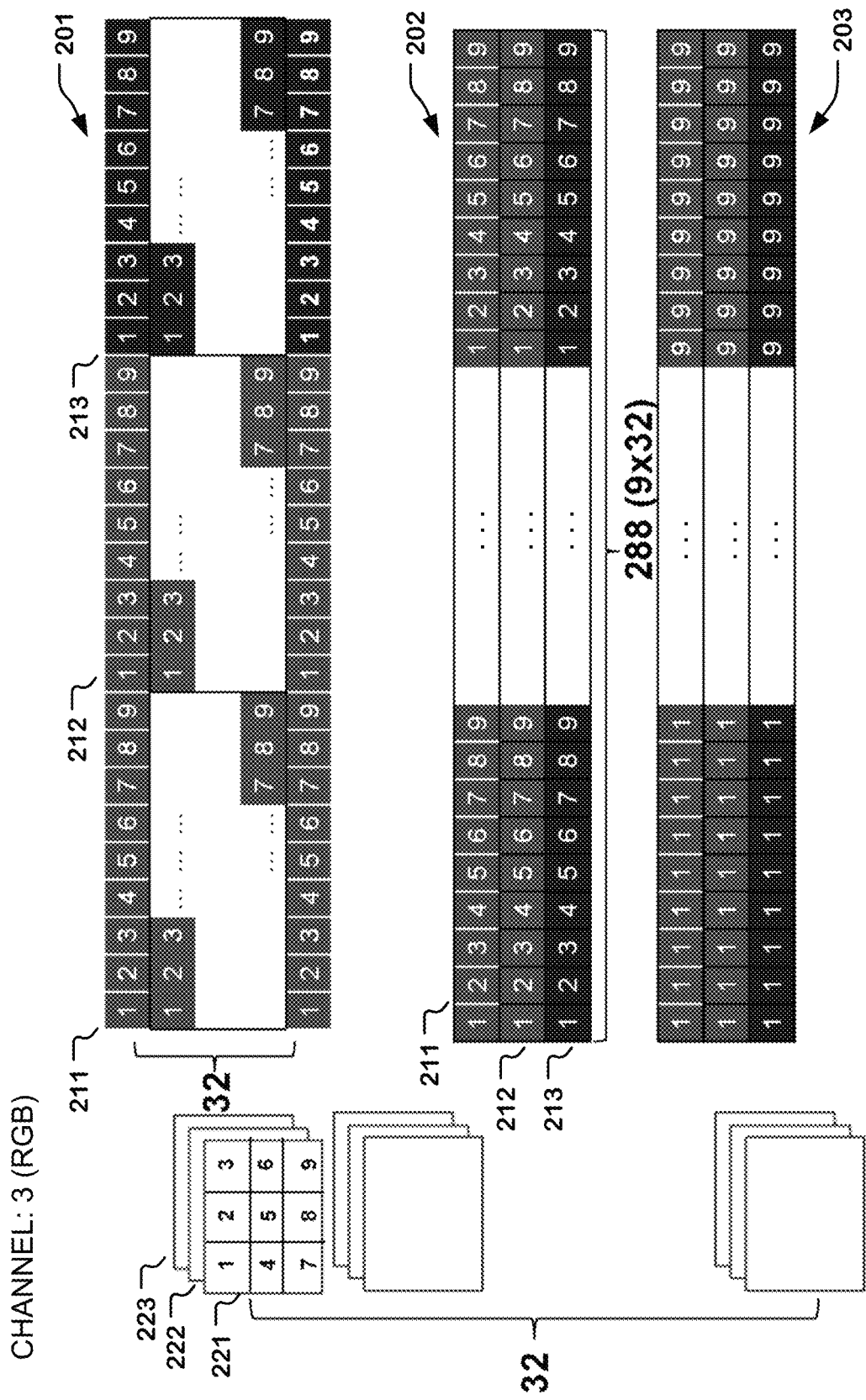
FIG. 2 illustrates weight data used by a neural network to process images being stored according to various storage paradigms by a high bandwidth non-volatile memory (NVM) in accordance with the technologies as described herein.

FIG. 2 illustrates weight data used by a neural network to process images being stored according to various storage paradigms by a high bandwidth NVM in accordance with the technologies as described herein. In the example implementation illustrated by FIG. 2, weight data is stored in the same page or multiple pages in the NVM and read in groups or sets of nine (9) weights for each of three (3) color neural network channels: red (1 to 9), green (1 to 9) and blue (1 to 9). A group (or set) of weights can comprise a filter or a feature map such that the filter can include weights that correspond to network nodes in a layer of the neural network defined in a neural network definition. In an implementation and by way of example, an input can be an input image of 224×224×3 pixels; where 3 is the number of channels, i.e., a red, a green, and a blue channel. However, an intermediate form of the data will become 224×224×64 after a first convolution processing is applied to the input image, because there are 64 3×3 filters (each comprising 9 weights) and each filter has 3 neural network channels, i.e., a red, a green, and a blue channel for convolutional neural network (CNN) processing.

In the example storage paradigms 201, 202, 203 illustrated by FIG. 2, there are 32 sets of 9 weights, each having a specific storage location, where a set of 9 weights 211, 212, 213 forms a respective 3×3 filter, e.g., 221, 222, 223. A set of 9 red weights 211 can be used to populate a red filter 221, a set of green weights 212 can be used to populate a green filter 222, and a set of blue weights 213 can populate a blue filter 223. Accordingly, there are 288 red weights (e.g., 32×9), 288 green weights and 288 blue weights. In sum, there is a total of 864 weights (288×3).

As depicted in FIG. 2, weights are stored from left to right in the diagram, which is from red to green to blue in paradigm 201. Accordingly, in paradigm 201, 3 fetch instances are needed to retrieve the first filter of 3 different, i.e., red, green, and blue channels, because, for example, this data might not be stored in the same page in memory, depending on the page size. Accordingly, for example, to populate each of the filters at least 96 read operations (32×3) will be required. If the weights are all stored in the same page, this processing can still require 3 read operations to obtain values for a filter for 3 different (e.g., R, G, and B) channels. That's why the order of the data can be re-arranged so that an AI inferencing engine can process all of the red data at once, if one page is large enough to hold all red data. If the page size is not large enough to hold the weights for all filters of the same color, the remainder of the same color weights will be stored continuing onto the next page in memory.

When the weight data is stored according to a first storage paradigm 201, resulting read processing that is of lower efficiency may result. If data location can be arranged (or re-arranged) and stored in a different ordering, such as paradigms 202, 203, then weight data can be read in once for red, green and blue filters. This will reduce data fetching times, resulting in decreased processing time during inferencing when the data needs to be read.

In paradigm 202, 9 weights for a red filter 211, 9 weights for a green filter 212 and 9 weights for a blue filter 213 have been stored together. In this configuration, a read operation can obtain weights to populate filters 221, 222, and 223 in a single read operation.

In paradigm 203, weights are arranged with all 1s grouped together, then all 2s grouped together, and so forth. This is another data re-arrangement to improve access when performing convolution processing. The input image will multiply 3×3 filter to do convolution processing. The processing in this paradigm is the same as in paradigm 202. Weights stored in the same location are comprised of red, green and blue stored together. In paradigm 202, all of the weights from filters 221, 222 and 223 are stored together. In paradigm 203, Weights from all filter 221, e.g., weights 1s, 2s and so on, are stored together. This different arrangement produces the same desired effect.

Of course, while 3×3 filters are used in this example illustrated by FIG. 2, filters could be constructed having practically any size, such as for example and without limitation embodiments that implement filters of 5×5, 8×8, in which cases, there would be 25, or 64, etc. total weight values per filter.

Figure 3:
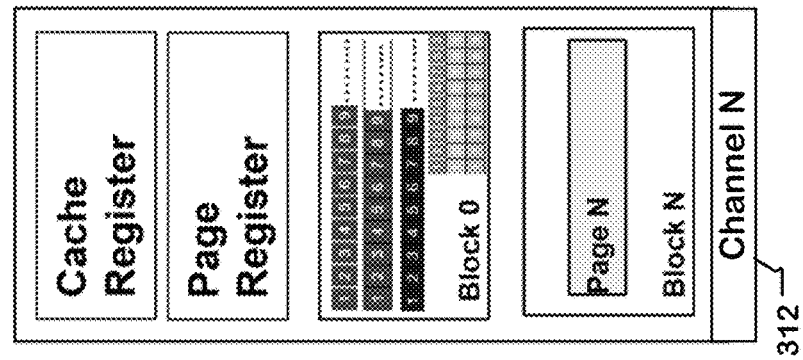
FIG. 3 is a schematic illustration of a technique of allocating weight data among multiple NVM channels by a high bandwidth NVM in accordance with the technologies as described herein.
Figure 3:
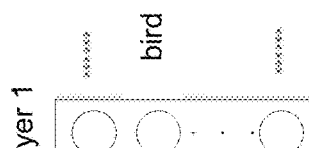
Figure 3:
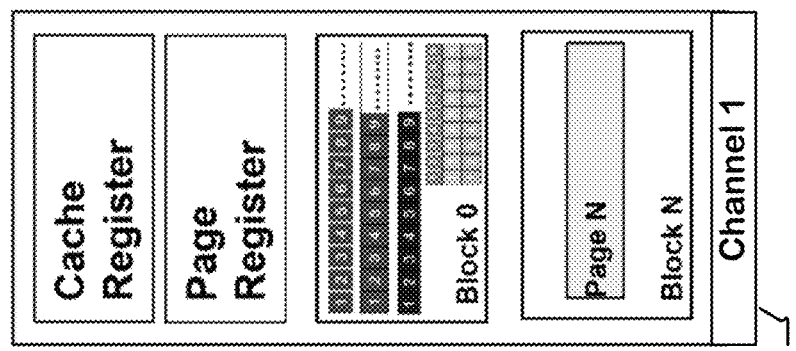
Figure 3:
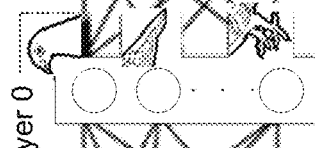
Figure 3:
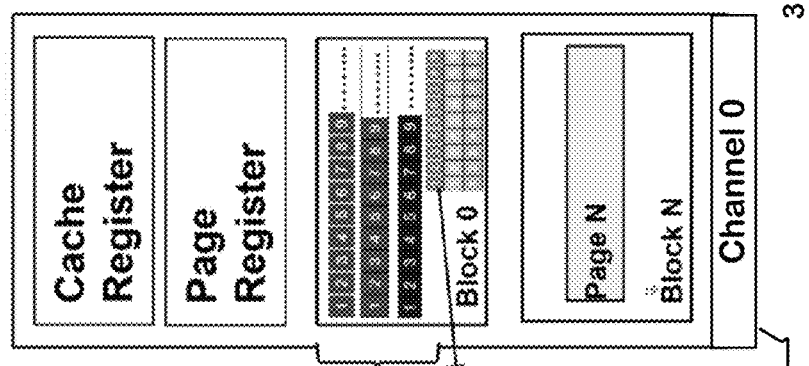
Figure 3:
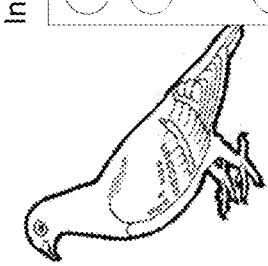

FIG. 3 is a schematic illustration of a technique of allocating weight data among multiple NVM channels by a high bandwidth NVM in accordance with the technologies as described herein. High bandwidth memory architecture 300 illustrated by FIG. 3 incorporates the use of channels 310, 311, 312 to enable data to be read from or stored to different NVM dies carrying memory arrays contemporaneously. Such memory channels used for data transfer along pathways to and from dies implementing non-volatile storage arrays. In some implementations, a channel controller can be shared by, i.e., can control, multiple channels as illustrated by 834, 844 in FIG. 8, which control channels 0-3 and channels 4-7 respectively.

In an implementation and by way of example, if a memory system has 4 channels, or multichannel NVM memory, the total weight data length can be distributed equally or otherwise among the memory channels (data length/channel). Of course, utilization of page size can be maximized using the techniques described above with reference to FIGS. 1-2. For example: 288 weights per neural network channel, e.g., 288 red weights (e.g., 32 filters×9 weights per filter), can be distributed among 4 memory channels, yielding 72 red weights per each memory channel, or 72 red weights/9 weights per filter yields 8 red filters per memory channel. Analogously, 8 green filters per memory channel; and 8 blue filters per memory channel.

Further, different layers of the neural network will employ different groups of weights. As shown in FIG. 3, for example, in the convolutional neural network (CNN), there are different layers 320A, 322A. For each layer, there are different filters 320B, 322B. Here, layer 0 is the first layer 320A in convolutional neural network and corresponds to the first layer filter (weights) 320B are stored in the page 0. If page 0 is not large enough, the weights data will be stored at a following page. Further, weights can be of a different type, and function for the different layers. For example, weights associated with layer 0 320B include weights grouped according to red, green and blue filters. Layer 1 322A includes weights grouped according to some other paradigm defined by the neural network definition. In some implementations, the weights corresponding to a first layer of a neural network can be stored according to one paradigm (e.g., 201, 202, or 203 of FIG. 2) and weights corresponding to a second layer of the neural network can be stored according to a different paradigm.

Figure 4:
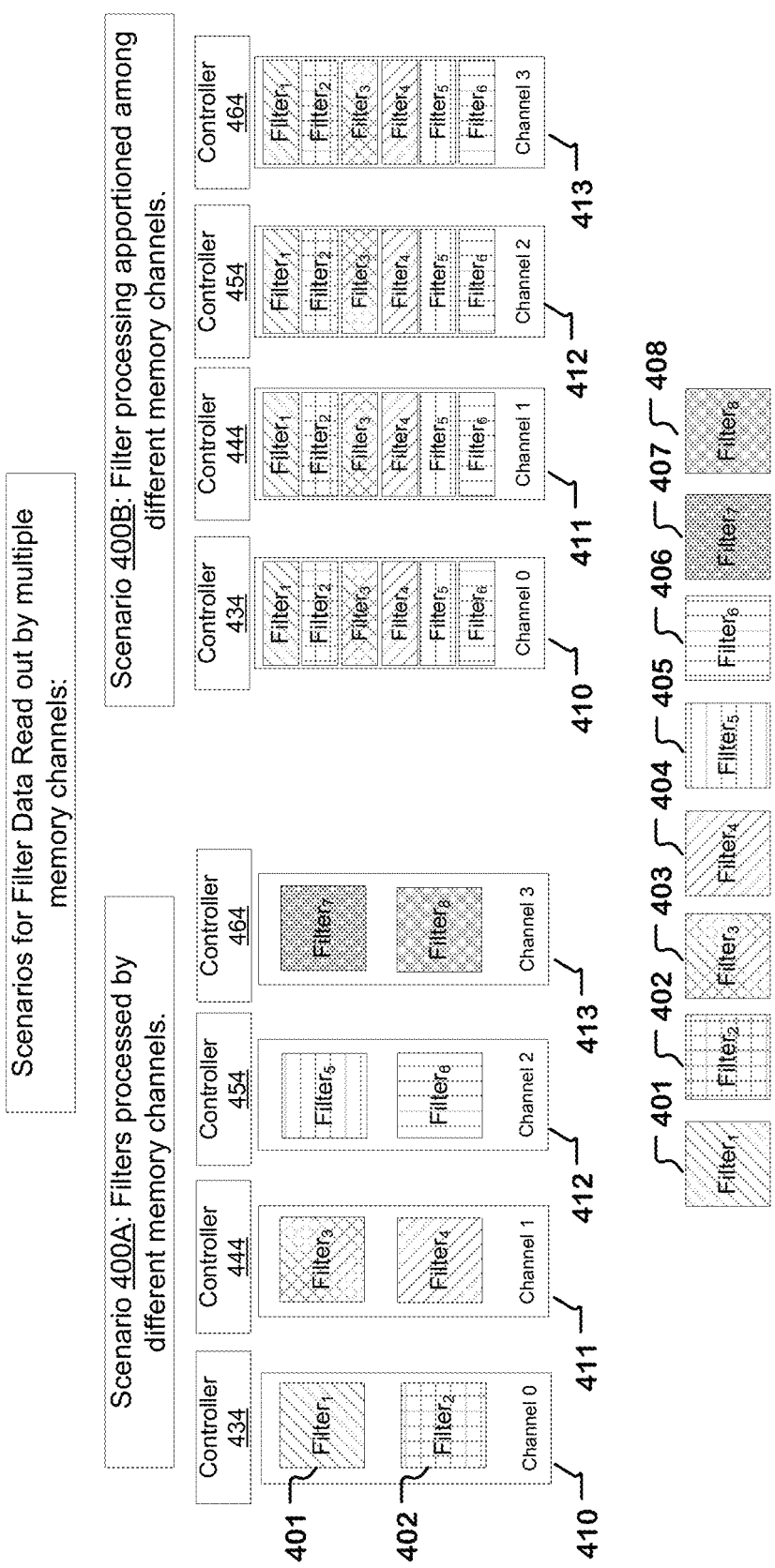
FIG. 4 is a schematic diagram illustrating multiple scenarios for allocating weight data among multiple NVM channels by a high bandwidth NVM in accordance with the technologies as described herein.

FIG. 4 is a schematic diagram illustrating multiple scenarios for allocating weight data among multiple NVM channels by a high bandwidth NVM in accordance with the technologies as described herein. Appropriate storage scenarios according to the present technology can provide for retrieval of the weights for two or more groups of weights (e.g., filters) without necessitating a read of an additional page of memory. For example, weights can be stored such that retrieval of all groups for the layer can be performed without necessitating triggering additional page of memory. In FIG. 4, weight data belonging to a plurality of filters (filter 1-filter 7) 401-408 can be read out by multiple memory channels (channel 0-channel 3) 410-413. A memory channel is used for data transfer via pathways to and from NVM dies implementing non-volatile storage arrays. In some implementations, the controller can be shared by, i.e., can control, multiple channels as illustrated by 834, 844 in FIG. 8, which control channels 0-3 and channels 4-7 respectively.

In scenario 400A, weights grouped according to filters can be allocated to individual memory channels. For example, the weights for filter 1 401 and filter 2 402 are stored for retrieval by channel 0 410. Accordingly, weights from filters can be stored to or retrieved from multiple arrays contemporaneously using multiple NVM channels. In this configuration, weights belonging to different filters can be read contemporaneously using different channels, however, if weights from different groups assigned to the same channel need to be read, for example from filter 1 and filter 2 in scenario 400A of FIG. 4, both belonging to channel 0 410, then multiple page reads might need to occur.

In scenario 400B, weights grouped according to filters are allocated to storage space across different channels. With reference to FIG. 4, the weights for filter 1 through filter 6 401-406 are apportioned among each of the four available channels (channel 0-channel 3) 410-413. In this scenario, weight data distributed among the multiple channels can be read in contemporaneously from NVM arrays by each of channel 0 through channel 3 410-413. Further, read operations against the NVM arrays of each channel have the capability to read weight data for each of the filters without necessitating a page retrieval when switching read operations from one filter to the next filter.

Figure 5:
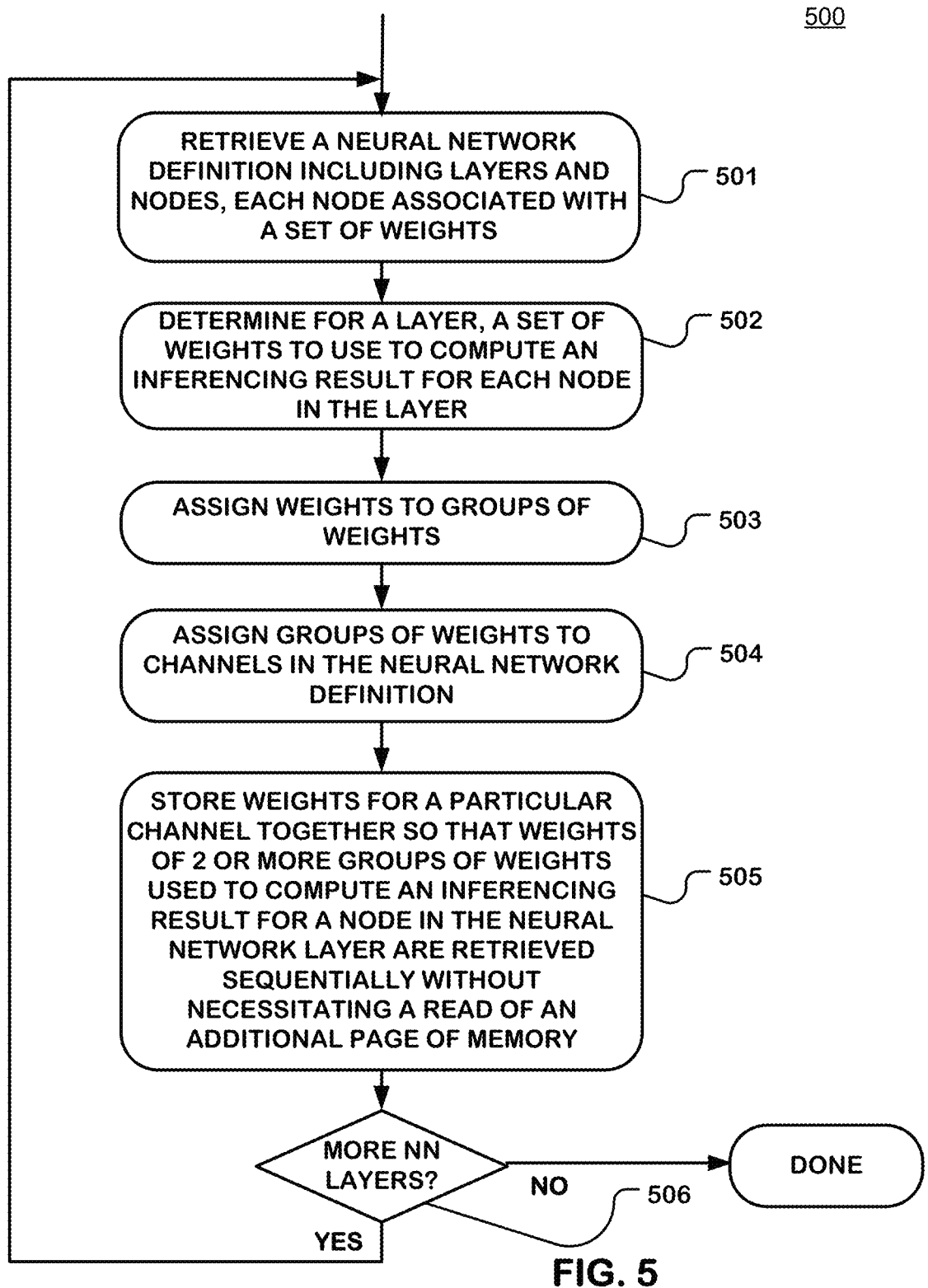
FIG. 5 is a flowchart illustrating an example of a weight data storage operation that can be executed by an inference system as described herein.
Figure 6:
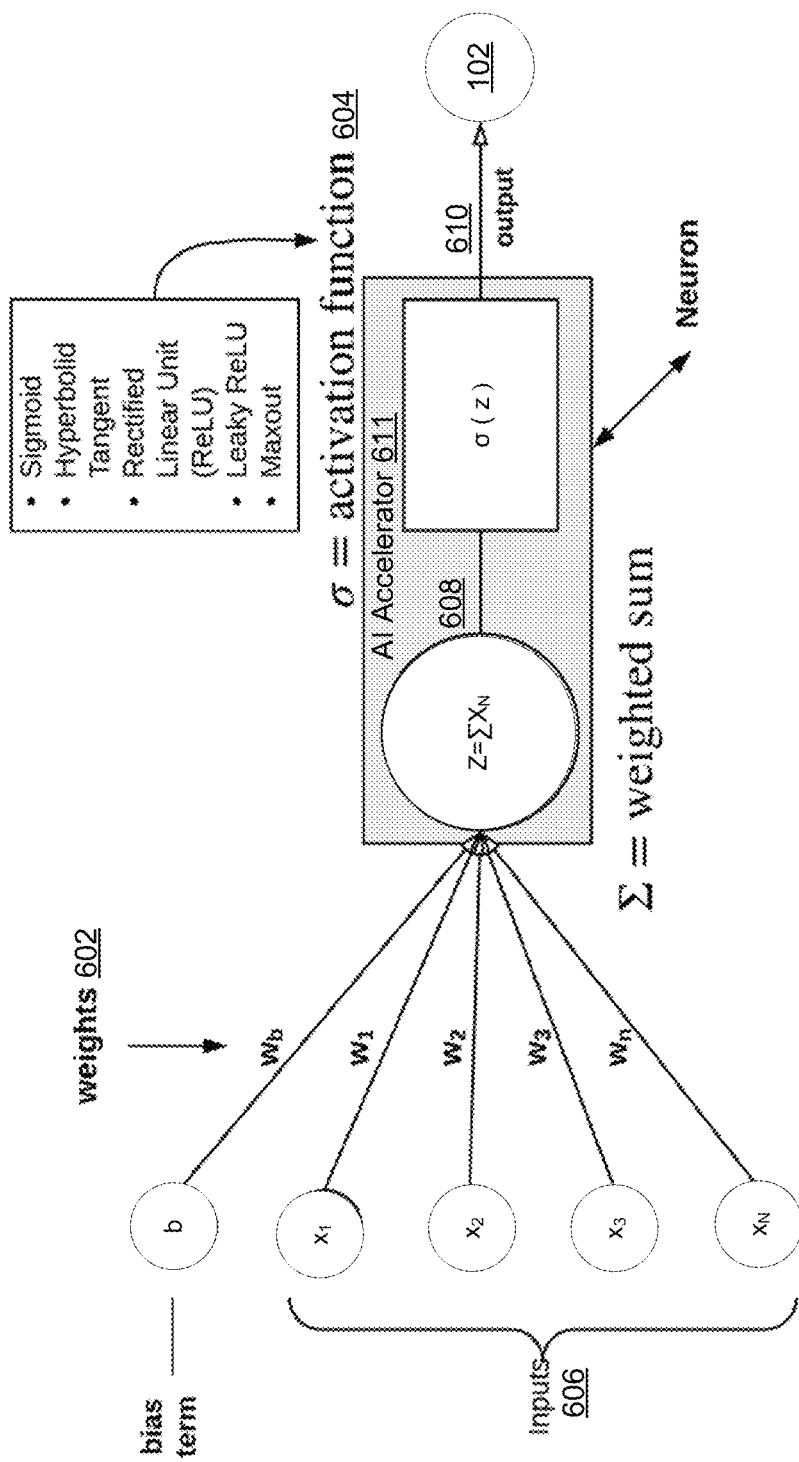
FIG. 6 is a simplified functional block diagram of a representative neural network node (neuron) including weight data stored into and read out from a high bandwidth NVM by the AI inference system logic as described herein.

FIG. 5 is a flowchart illustrating an example of logic of a weight data storage operation that can be executed by an inference system, such as described with reference to FIGS. 1-4. FIG. 6 is a simplified functional block diagram of a representative neural network node (neuron) including weight data stored into and read out from a high bandwidth NVM by the AI inference system logic as described herein. The logic can be implemented using machine executable instructions stored in memory, such as the SRAM on-chip memory 805, or other memory accessible by the processor 810 coupled with a logic layer die including channel logic implementing connections between a plurality of channels conducting data to and from an accelerator core via at least one bus, and a plurality of NVM dies stacked vertically one above another, forming a layered vertical stack of NVM dies, each of the NVM dies including at least one memory chip and a plurality of direct vertical connections to a corresponding channel logic in the logic layer. FIG. 8 is discussed in more detail below, following the discussion regarding FIGS. 5-7. In this example, a collection of weights for artificial intelligence neural network computations downloaded from an external source, such as a network, is loaded into the high bandwidth NVM of the inference system.

Figure 7:
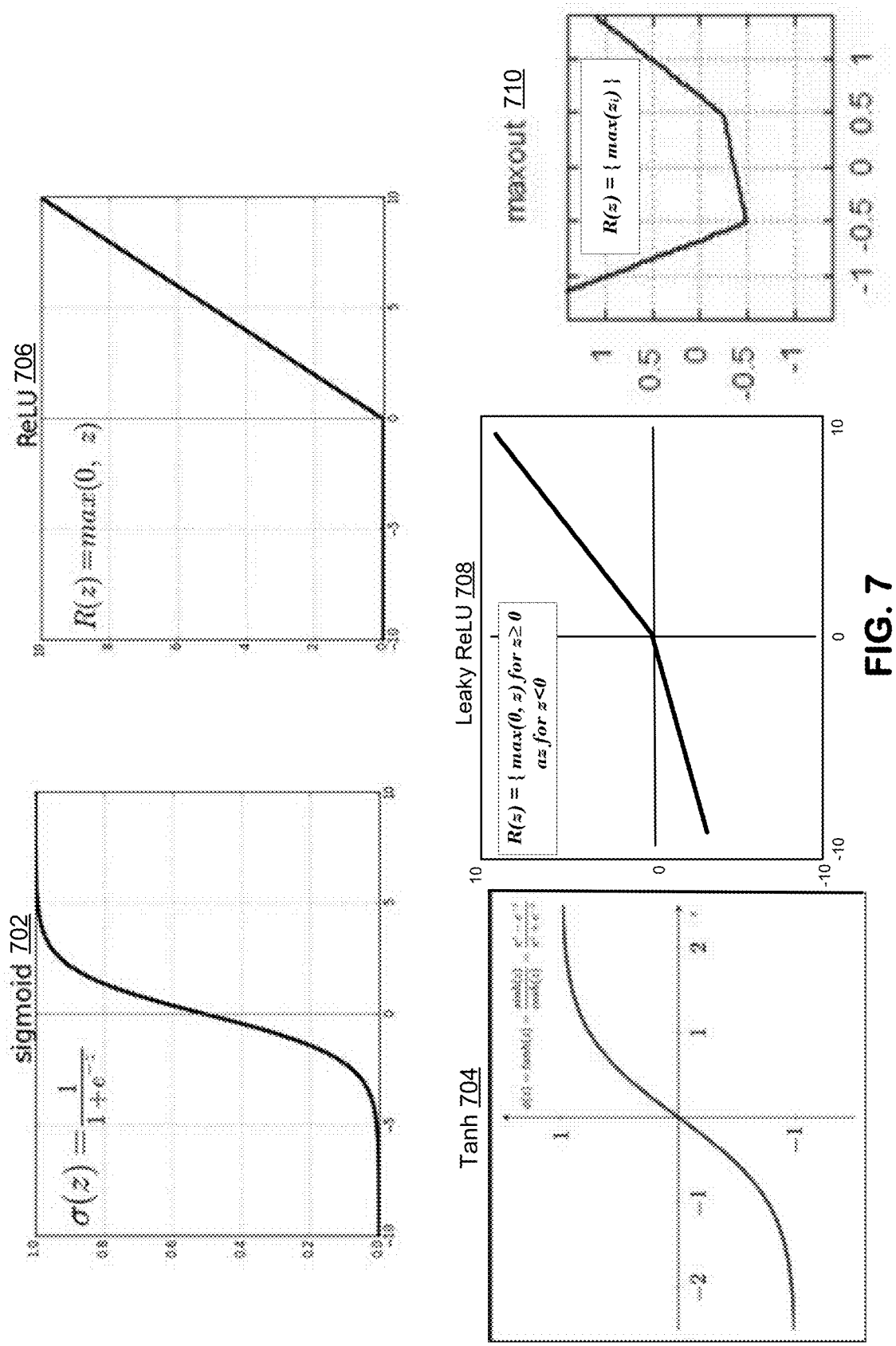
FIG. 7 illustrates representative activation functions suitable for implementing artificial intelligence inferencing as described herein.
Figure 8:
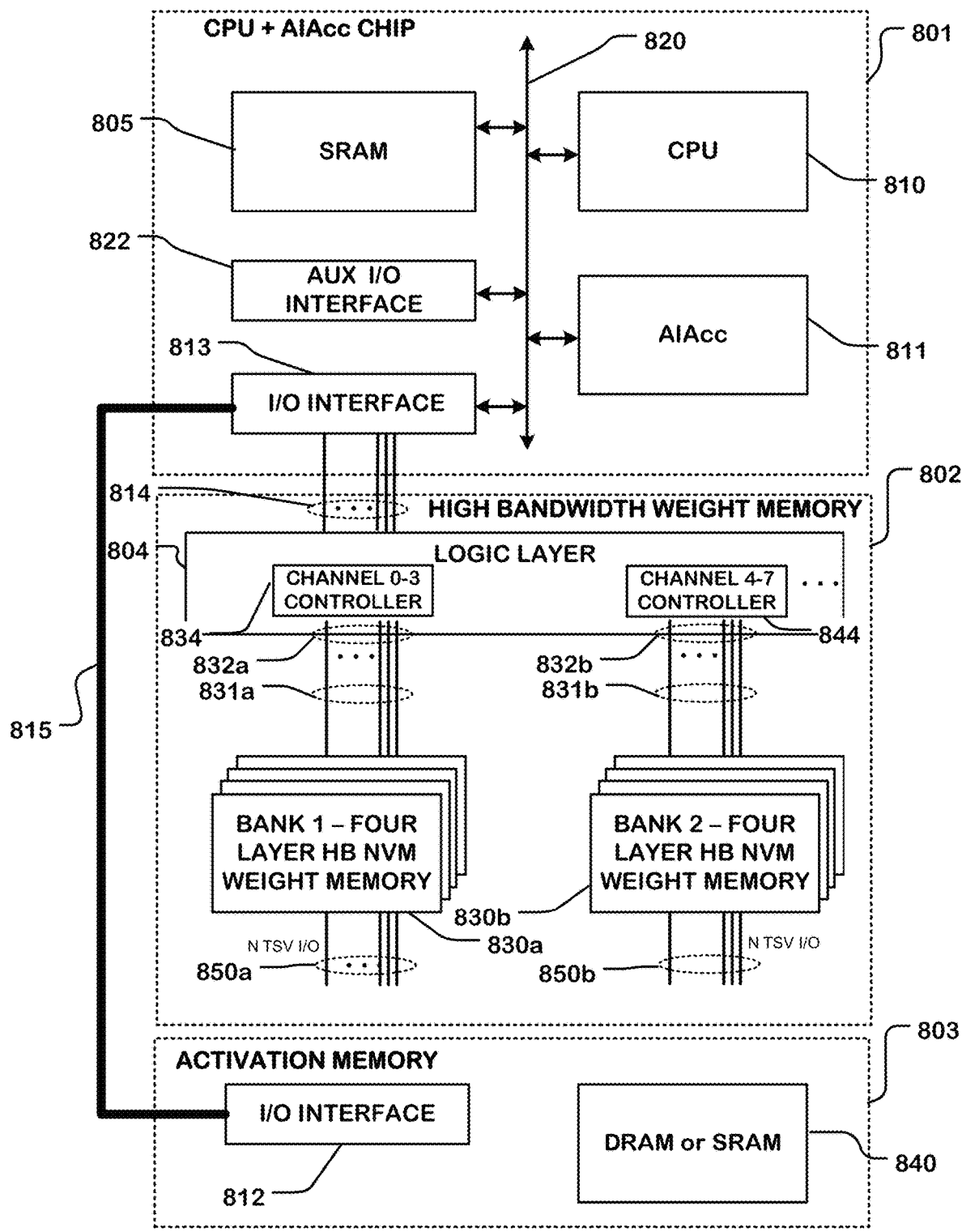
FIG. 8 is a simplified functional block diagram of an inference system as described herein.

With reference to FIGS. 5, 6, and 7, during runtime, an operation retrieves a neural network definition that includes layers and nodes, each node associated with weights 602 (e.g., Wb, W1, W2, W3, and Wn) (operation 501). This definition may be stored in the high bandwidth NVM (e.g., 802 of FIG. 8), or an auxiliary memory (e.g., 803 of FIG. 8) or otherwise obtained from an external source off chip. Sets of weight data are determined for the layer of the neural network to perform calculations (operation 502).

After sets of weights are determined for the layer, the weights are assigned to groups (operation 503) for one or more nodes of the neural network layer.

Next, the groups of weights (e.g., 211, 212, 213) are assigned to channels (operation 504) in the neural network definition. For example, in operation 504, the weights for red filters can be assigned to the red channel of a neural network. The resulting groupings of weights for the channels are stored in the high bandwidth NVM, e.g., memory 802, such that weights for a particular channel can be stored together so that weights of 2 or more groups of weights used to compute an inferencing result for a node in the neural network layer are retrieved sequentially without necessitating a read of an additional page of memory (operation 505). The procedure includes checking if nodes at further neural network layers are to be processed (operation 506) and if so, restarting operations 501 to 506 for the next batch of neural network nodes to be processed. If there are no further layers to process then all weights for the neural network definition have been successfully stored.

Thus, the operations of FIG. 5 include an operation to neural network definition data defining layers and nodes, each node associated with a set of weights. Also, as shown in FIG. 5, after determining weights to use to compute an inferencing result for nodes in a layer, assigning the weights to groups of weights and assigning the groups of weights to channels in the neural network definition, the weights are stored for a particular channel together so that the weights of 2 or more groups of weights used to compute an inferencing result for a node in the neural network layer are retrieved sequentially without necessitating a read of an additional page of memory, the operations loop to operation 501, to process a next layer of the neural network. As discussed above with reference to FIG. 4, operation 505 can optionally include allocating or apportioning weights belonging to some groups across multiple memory channels in multi-channel HBW memory architectures. If more neural network nodes are to be processed, the operations 501 to 506 are repeated, and can include loading the weights for the nodes of the next neural network layer.

It will be appreciated with reference to FIG. 5, that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the present technology, and it will be understood that numerous additional steps for accomplishing other functions can be performed before, after and between those shown.

Referring to FIG. 8, during training processing, weights stored in NVM dies (e.g., of the weights memory 802) are adjusted by the processor chip 801 (e.g., a CPU and an AIAcc) based upon training dataset(s). As training progresses, the processor chip 801 will keep updating values for the weights and this value will be stored in the NVM. In some implementations, weights are fixed during inference processing.

FIG. 8 is a simplified functional block diagram of an inference system as described herein. The platform includes a processor chip 801 (e.g., a CPU and an AIAcc), a first memory chip 803 (an activation memory storing activation data), and a second memory chip 802 (e.g., a weigh memory storing weight data for a neural network). The processor chip 801 in this example includes a CPU or processor core 810, accelerator core 811, on-chip memory 805, such as SRAM (or other type of memory) which can be used as working memory and as a cache memory, a first I/O interface 813 and a second I/O interface 822. A bus system 820 provides for intra-chip communications among the components of the processor chip 801.

The first memory chip 803 in this example comprises a high capacity, volatile memory 840 such as DRAM or SRAM (or a nonvolatile memory such as 3D NAND or other type of memory implemented using charge trapping storage technology), for example. The first memory chip 803 includes a first memory I/O interface 812 for off-chip communications. The first memory I/O interface 812 can comprise a high-speed serial port, such as a serial peripheral interface (SPI) compatible port, or a parallel port, depending on the particular implementation of the memory chip 803 that is utilized. A data path 815 is provided in this example between the first memory I/O interface 812, and the first I/O interface 813 on the processor chip 801. First memory chip 803 can store activation data in accordance with an activation function used to compute an inference result. With reference to FIG. 7, suitable activation data can include stored data implementing an activation function including one or more of a sigmoid function 702, a hyperbolic tangent (tanh) function 704, a rectified linear unit (ReLU) function 706, a leaky rectified linear unit (LReLU) function 708, and a maxout function 710.

Now with continued reference to FIG. 8, the second memory chip 802, in this example, comprises a HBW NVM configured in one or more banks 830a, 830b, each of which can comprise one or more layers of NVM dies arranged in channels. The NVM can be one of a phase change memory (PCM), a three-dimensional cross point memory (3D Xpoint), and a NAND flash memory. In other examples, the second memory chip 802 can comprise NOR flash memory using charge trapping storage technology, or other suitable random-access technologies like resistive RAM (e.g. metal oxide memory), magnetic RAM, Ferroelectric RAM a conductive bridge random-access memory CBRAM and so on.

The second memory chip 802 includes a memory I/O interface 814 for off-chip communications via a logic layer 804 to the I/O interface 813 on the processor chip 801. Logic layer 804 includes channel controllers 834, 844 that provide control of multiple channels forming one or more sets of high-speed data pathways on which weight data can flow across an interface 832a, 832b exposed on a surface of the logic layer 804, and complementary to the interface 831a, 831b on a surface of banks 830a, 830b of NVM dies arranged in layers direct connected by vertical connections 850a, 850b at the surfaces provided between the IO-memory interface 832a, 832b and the memory-IO interface 831a, 831b. The direct vertical connections 850a, 850b can comprise very short length copper via-to-via conductors or other chip-to-chip contact technologies suitable for high speed, low latency, and low power communication between the chips. In an implementation and by way of example, two stacks are formed by stacking four NVM dies with N/8 through silicon via (TSV) I/O per die onto a logic die; wherein N is the total number of TSV IO, and 8 is number of dies; N/8 is IO per die. One NVM die has one channel; one channel is N/8 through silicon via (TSV) I/O. Each channel is completely independent so each channel can operate independently. One controller can control multiple channels. An external controller can be provided in a field programmable gate array (FPGA) or system on a chip (SoC) die (e.g., implementing processor 801).

DRAM is an option to bond into the system in package (SiP) in case on-chip SRAM is not big enough.

Thermal (heat) management can used to guarantee data retention.

An AI accelerator (e.g. accelerator core 811), as the term is used herein, is a configurable logic circuit including components designed or suitable for execution of some or all of the arithmetic operations of AI inference operations. Configuration of the accelerator core can include loading a set of weights from memory 802 to be used in conducting inference operations, or parts of the set of weights. In some embodiments, configuration of the accelerator core can include loading some or all of the of the computation graphs of an inference model that define the sequence and architecture of the operation of the inference model. The inference model can comprise a computation graph of a deep learning neural network, in some examples having a plurality of fully connected and partially connected layers, activation functions, normalization functions and so on.

An accelerator core can be implemented using configurable logic, like arrays of configurable units used in field programmable gate arrays for example, in which compiled computation graphs are configured using bit files. An accelerator core can be implemented using a hybrid of data flow configurable logic and sequential processing configurable logic.

A runtime processor core (e.g. CPU 810) can execute a runtime program to coordinate operation of the accelerator core to accomplish real time inference operations, including data input/output operations, loading computation graphs, moving the set of weights to be applied in the inference operation into and out of the accelerator core, delivering input data to the accelerator core, and performing parts of the computations to obtain inference results.

Figure 9:
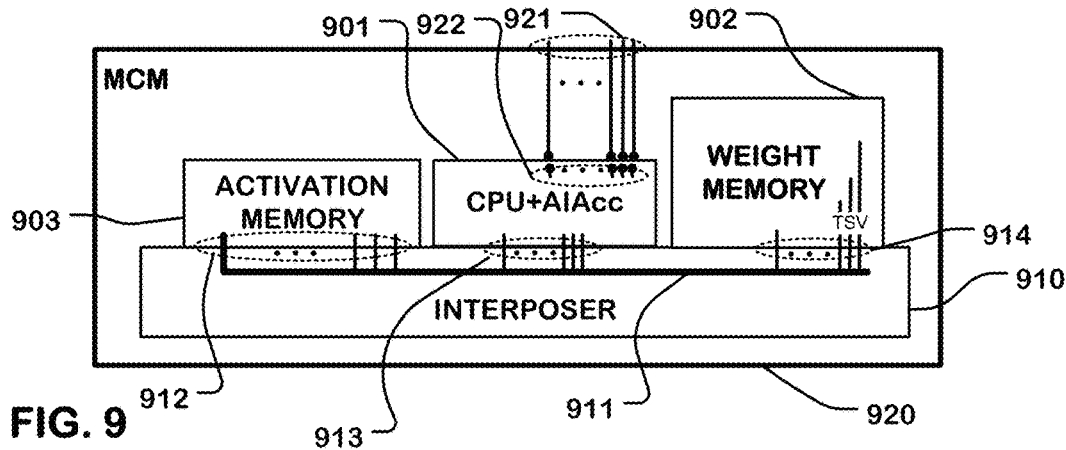
FIG. 9 is an illustration of a multichip module including a high bandwidth memory for artificial intelligence (AI) inferencing as described herein.
Figure 10:
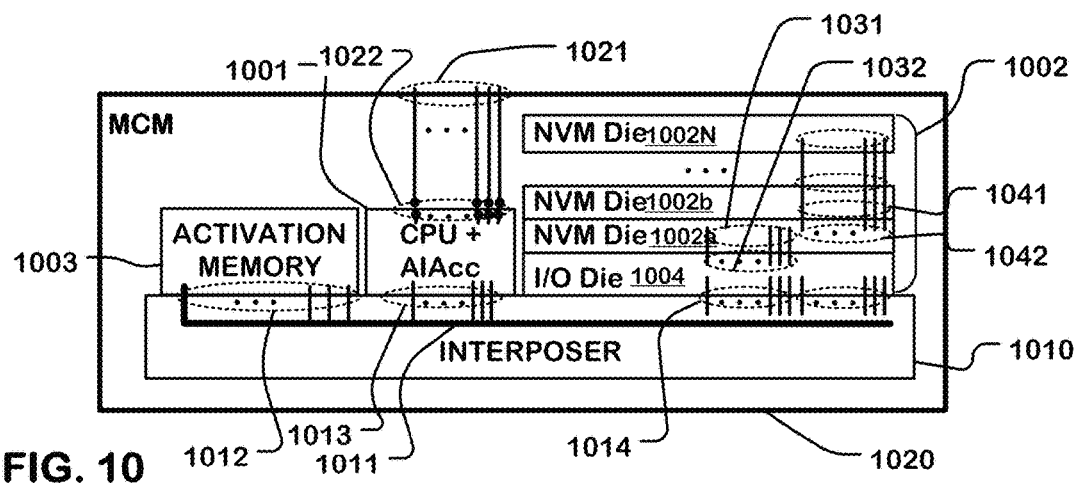
FIG. 10 is an illustration of another embodiment of a multichip module including a high bandwidth memory for AI inferencing as described herein.
Figure 11:
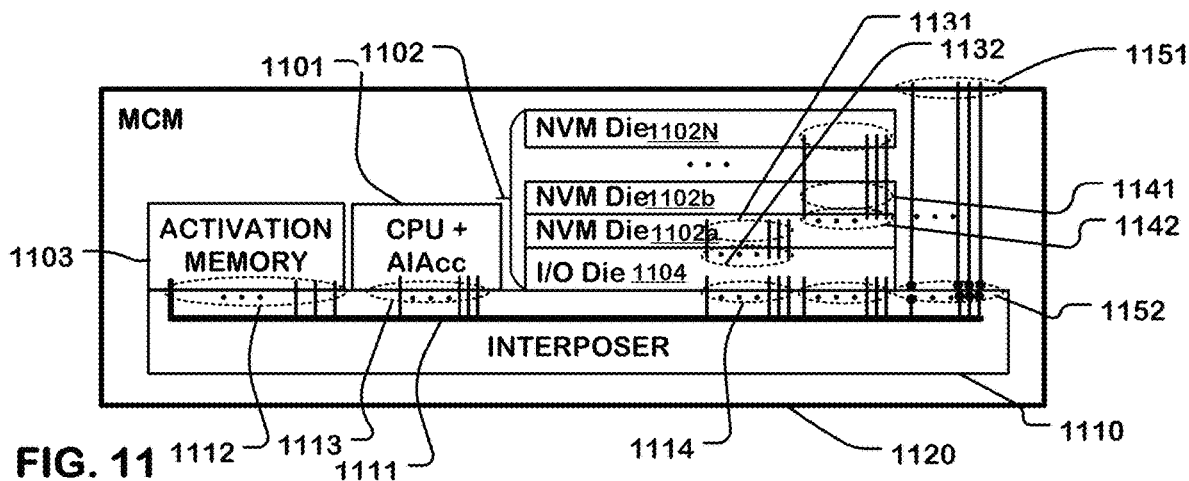
FIG. 11 is an illustration of yet another embodiment of a multichip module including a high bandwidth memory for AI inferencing as described herein.

FIGS. 9-11 provide example arrangements of an inference system with high bandwidth NVM as described herein, showing varieties of configurations of the chips and connections among the chips, the interposer and external contacts of the package. Other arrangements can be implemented as suits a particular need.

FIG. 9 illustrates a multichip module (MCM) 920 that includes a processor chip 901, a first memory chip 903 (e.g., an activation memory storing activation data), and second memory chip 902 (e.g., a weight memory storing weight data for a neural network). The weight memory can be considered HBW memory. In this example, mounted on an interposer 910 (or substrate) are the processor chip 901, the second memory chip 902, which can be a HBW NVM for storing weights (e.g., weight data) used in neural network computations, and the first memory chip 903, which can be dynamic random access memory (DRAM), static random access memory (SRAM) or NAND, however DRAM and SRAM are presently preferred options, for storing activation data for activation functions used in neural network computations. The assembly is configured as a multichip module 920 in a single package.

The processor chip 901 can include a runtime processor core (e.g. CPU) and an accelerator core, such as an artificial intelligence accelerator (e.g. AIAcc) or a neuron processing unit (NPU).

In this example, processor chip 901 includes an input/output interface 913 disposed on the surface of the chip 901. The input/output interface 913 is connected to interconnection wiring 911 on the interposer 910.

The first memory chip 903 includes an interface 912 for connection to the interconnection wiring 911 on the interposer 910. The second memory chip 902 includes an interface 914 for connection to the interconnection wiring 911 on the interposer 910. While depicted as a single entity in FIG. 9 for clarity, second memory 902 can comprise multi-layered stack, in which memory dies are disposed on different layers and can be connected to vertical connectors such as through silicon via (TSV) connections to interconnection wiring 911 on the interposer 910.

Thus, interconnection wiring 911 provides part of the data path between the first memory chip 903, the second memory chip 902, and the processor chip 901.

In the example illustrated in FIG. 9, the processor chip 901 includes another input/output interface 922 for connection to external contact structures 921 of the multichip module 920.

FIG. 10 illustrates another configuration of an inference system as described herein. This configuration includes a processor chip 1001, a first memory chip 1003 (e.g., an activation memory storing activation data), and a second memory chip 1002 (e.g., a weight memory storing weight data for a neural network), which can be considered HBW memory. In this example, the second memory chip 1002 comprises individual layered NVM dies 1002a-1002N mounted to an I/O die 1004 implementing connection logic in a logic layer. The processor chip 1001, the I/O die 1004 of the second memory chip 1002, and the first memory chip 1003 are mounted on an interposer 1010 (or substrate). The assembly is configured as a multichip module (MCM) 1020 in a single package.

The processor chip 1001 can include a runtime processor core (e.g. CPU) and an accelerator core, such as an artificial intelligence accelerator (e.g. AIAcc) or a neuron processing unit (NPU).

The second memory chip 1002 includes the plurality of non-volatile memory dies 1002a-1002N stacked one on top of another and stacked above the I/O die 1004. One such NVM die 1002a illustrated includes a chip-to-chip bonding surface on which an interface 1031 is exposed for connection to the I/O die 1004. The I/O die 1004 includes an interface 1032 exposed on a surface of the I/O die 1004, and complementary to the interface 1031 on the NVM die 1002a. In this example, direct vertical connections at the surfaces are provided between the memory interface 1032 and the interface 1031. The direct vertical connections can comprise very short length copper via-to-via conductors or other chip-to-chip contact technologies suitable for high speed, low latency, and low power communication between the chips.

With continuing reference to the second memory chip 1002, another NVM die 1002b illustrated includes a chip-to-chip bonding surface on which an interface 1041 (e.g., an NVM-NVM interface) is exposed for connection to NVM die 1002a of the second memory chip 1002. The NVM die 1002a includes an interface 1042 (e.g., an NVM-NVM interface) exposed on a surface of the NVM die 1002a, and complementary to the interface 1041 on the NVM die 1002b. In this example, direct vertical connections at the surfaces are provided between the NVM-NVM interface 1042 and the NVM-NVM interface 1041.

In some implementations, an interposer layer provides connection between the plurality of direct vertical connections of the vertical stack (e.g., NVM dies 1002a-1002N) to corresponding channel logic in the logic layer (e.g., I/O die 1004). In some implementations, a plurality of solder bumps that have been deposited onto chip pads of the logic layer (e.g., I/O die 1004) and the plurality of NVM dies (e.g., 1002a-1002N) provide connection with a device immediately below. In some implementations, a plurality of backside interconnects have been deposited onto chip pads of the logic layer and the plurality of NVM dies provide wafer-to-wafer connection with a device above. The AI inference memory device can be packaged as any of a 10.5D through silicon via (TSV) integrated circuit, a three-dimension (3D) through silicon via (TSV) integrated circuit and a three-dimensional (3D) system-on-chip (3D SOC) integrated circuit.

In this example, the processor chip 1001 includes an input/output interface 1013 disposed on the surface of the chip 1001. The input/output interface 1013 is connected to interconnection wiring 1011 on the interposer 1010.

The first memory chip 1003 includes an interface 1012 for connection to the interconnection wiring 1011 on the interposer 1010.

Also, the I/O chip 1004 includes an interface 1014 for connection to the interconnection wiring 1011 on the interposer 1010.

Thus, interconnection wiring 1011 provides part of the data path between the first memory chip 1003 and the second memory chip 1002, and the processor chip 1001.

In the example illustrated in FIG. 10, the processor chip 1001 includes another input/output interface 1022 for connection to external contact structures 1021 of the multichip module 1020.

FIG. 11 illustrates another configuration of an inference system as described herein. This configuration includes a processor chip 1101, a first memory chip 1103 (e.g., an activation memory storing activation data), and a second memory chip 1102 (e.g., weight memory storing weight data for a neural network), which can be considered HB memory. In this example, the second memory chip 1102 comprises individual layered non-volatile memory (NVM) dies 1102a-1102N mounted to an I/O die 1104. The processor chip 1101, the I/O die 1104 of the second memory chip 1102, and the first memory chip 1103 are mounted on an interposer 1110 (or substrate). The assembly is configured as a multichip module (MCM) 1120 in a single package.

The processor chip 1101 can include a runtime processor core (e.g. CPU) and an accelerator core, such as an artificial intelligence accelerator (e.g. AIAcc) or a neuron processing unit.

The second memory chip 1102 includes the plurality of non-volatile memory dies 1102a-1102N stacked one on top of another and stacked above an I/O die 1104. One such NVM die 1102a illustrated includes a chip-to-chip bonding surface on which an interface 1131 is exposed for connection to the I/O die 1104. The I/O die 1104 includes an interface 1132 exposed on a surface of the I/O die 1104, and complementary to the interface 1131 on the NVM die 1102a. In this example, direct vertical connections at the surfaces are provided between the interface 1132 and the interface 1131. The direct vertical connections can comprise very short length copper via-to-via conductors or other chip-to-chip contact technologies suitable for high speed, low latency, and low power communication between the chips.

With continuing reference to second memory chip 1102, another NVM die 1102b illustrated includes a chip-to-chip bonding surface on which an interface 1141 (e.g., an NVM-NVM interface) is exposed for connection to NVM die 1102a the second memory chip 1102. The NVM die 1102a includes an interface 1142 (e.g., an NVM-NVM interface) exposed on a surface of the NVM die 1102a, and complementary to the interface 1141 on the NVM die 1102b. In this example, direct vertical connections at the surfaces are provided between the NVM-NVM interface 1142 and the NVM-NVM interface 1141.

In some implementations, interposer layer 1110 provides connection between the plurality of direct vertical connections of the vertical stack (e.g., NVM chips 1102a-1102N) to corresponding channel logic in the logic layer (e.g., I/O die 1104). In some implementations, a plurality of solder bumps that have been deposited onto chip pads of the logic layer (e.g., I/O die 1104) and the plurality of NVM dies (e.g., 1102a-1102N) provide connection with a device immediately below. In some implementations, a plurality of backside interconnects have been deposited onto chip pads of the logic layer and the plurality of NVM dies provide wafer-to-wafer connection with a device above. The AI inference memory device can be packaged as any of a 2.5D through silicon via (TSV) integrated circuit, a three-dimension (3D) through silicon via (TSV) integrated circuit and a three-dimensional (3D) system-on-chip (3D SOC) integrated circuit.

In this example, processor chip 1101 includes an input/output interface 1113 disposed on the surface of the chip 1101. The input/output interface 1113 is connected to interconnection wiring 1111 on the interposer 1110.

The first memory chip 1103 includes an interface 1112 for connection to the interconnection wiring 1111 on the interposer 1110.

Also, the I/O die 1104 includes an interface 1114 for connection to the interconnection wiring 1111 on the interposer 1110.

Thus, interconnection wiring 1111 provides part of the data path between the first memory chip 1103 and the second memory chip 1102, and the processor chip 1101.

In the example illustrated in FIG. 11, the multichip module (MCM) 1120 includes another input/output interface 1152 for connection to external contact structures 1151 of the multichip module 1120.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

As used herein, a network node, including network nodes referred to as client side nodes and a server side nodes, is an application hosted on an active electronic device, or virtual device executed in an active electronic device such as a cloud-based platform, that is attached to a network, and is capable of sending, receiving, or forwarding information in support of computer programs such as servers and clients, over a physical media for a communications channel on the network, and having for example media access control addresses and protocol stacks that support higher network layers. A network can include the networks using Internet Protocol addresses, or other type of network layer addresses. In some embodiments the network comprises the Internet. Examples of electronic devices which can host network nodes, include all varieties of computers, workstations, laptop and desktop computers, hand-held computers and smart phones, and cloud-based platforms.

A byte is a basic storage unit used in many integrated circuit logic and memory circuits, and consists of eight bits. Basic storage unit can have other sizes, including for example one bit, two bits, four bits, 16 bits and so on. Thus, the description of weight data optimization for high bandwidth (HBW) non-volatile memories in AI inferencing systems as set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the present technology, and it will be understood that numerous additional steps for accomplishing other functions can be performed before, after and between those shown.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the present technology and the scope of the following claims.

What is claimed is:

1. A method for storing weight data used to compute node values during artificial intelligence (AI) inferencing operations conducted by a neural network, the method comprising:
   receiving a neural network definition defining a neural network having a plurality of layers, each layer comprising a plurality of neural network nodes, each neural network node using one or more weights to compute a result for the neural network node by applying a function to (i) the one or more weights and (ii) an input to the neural network node during an inferencing operation;
   determining, for a layer of the plurality of layers defined in the neural network definition, a set of weights to use to compute a neural network inferencing result for each neural network node of the plurality of neural network nodes in the layer; and
   storing the set of weights determined for the layer in a page of memory, such that any weights, of the set of weights, used to compute the neural network inferencing result for each neural network node of the plurality of neural network nodes in the layer are stored together in the page of memory for retrieval together.

2. The method of claim 1, further including processing a next layer in the neural network definition, such that a second set of weights used to compute a neural network inference result for the next layer are also stored together in the page of memory for retrieval together.

3. The method of claim 1, wherein weights in the set of weights are assigned to groups of weights and each group of weights is assigned to a channel in the neural network definition, and wherein the storing further includes storing weights of a particular channel together such that weights of two or more groups of weights used to compute the neural network inferencing result for each neural network node of the plurality of neural network nodes in the layer are retrieved sequentially without necessitating a read of an additional page of memory.

4. The method of claim 3, wherein the retrieving of the weights of the two or more groups of weights further includes retrieving all groups for a layer without necessitating a read of an additional page of memory.

5. The method of claim 3, wherein each group of weights corresponds to a particular channel of the neural network.

6. The method of claim 5, wherein each channel of the neural network corresponds to a filter populated by the weights of a respective group of weights.

7. The method of claim 6, wherein the filter of each corresponding channel comprises weights arranged in a pattern selected from a 3×3 pattern, a 4×4 pattern, a 5×5 pattern, and a 6×6 pattern.

8. The method of claim 3, wherein weights are stored to and read from one or more NVM dies implementing non-volatile storage arrays, and wherein a plurality of memory channels facilitate transfer of the weights along pathways to and from the one or more NVM dies.

9. The method of claim 8, wherein all weights belonging to a group are allocated to a particular memory channel.

10. The method of claim 8, wherein weights belonging to a group are apportioned among multiple memory channels.

11. The method of claim 1, further comprising retrieving each weight in the set of weights from a previous storage location in memory prior to storing the set of weights determined for a layer in a page of memory; thereby re-arranging weight data in the memory.

12. An artificial intelligence (AI) inference memory device, comprising:
    a plurality of non-volatile memory (NVM) dies, each of the NVM dies including at least one memory array and a plurality of connections to corresponding channel logic to provide storage into and retrieval from the memory array;
    wherein a neural processing unit (NPU) implementing an accelerator core connected via the corresponding channel logic for transmitting data to and from the memory arrays is configured to implement operations including:
       receiving a neural network definition defining a neural network having a plurality of layers, each layer comprising a plurality of neural network nodes, each neural network node using one or more weights to compute a result for the neural network node by applying a function to (i) the one or more weights and (ii) an input to the neural network node during an inferencing operation;
       determining, for a layer of the plurality of layers defined in the neural network definition, a set of weights to use to compute a neural network inferencing result for each neural network node of the plurality of neural network nodes in the layer; and
       storing the set of weights determined for the layer in a page of memory of the memory arrays, such that any weights, of the set of weights, used to compute the neural network inferencing result for each neural network node of the plurality of neural network nodes in the layer are stored together in the page of memory for retrieval together.

13. The AI inference memory device of claim 12, wherein the plurality of NVM dies include NAND flash.

14. The AI inference memory device of claim 12, wherein weights in the set of weights are assigned to groups of weights and each group of weights is assigned to a channel in the neural network definition, and wherein the storing further includes storing weights of a particular channel together such that weights of two or more groups of weights used to compute the neural network inference result for each neural network node of the plurality of neural network nodes in the layer are retrieved sequentially without necessitating a read of an additional page of memory of the memory arrays.

15. The AI inference memory device of claim 14, wherein the retrieving of the weights of the two or more groups of weights further includes retrieving all groups for a layer without necessitating a read of an additional page of memory of the memory arrays.

16. The AI inference memory device of claim 12, wherein weights are stored to and read from one or more of the NVM dies, and wherein a plurality of memory channels facilitate transfer of the weights along pathways to and from the one or more NVM dies.

17. The AI inference memory device of claim 16, wherein all weights belonging to a group are to a particular memory channel.

18. The AI inference memory device of claim 16, wherein weights belonging to a group are apportioned among multiple memory channels.

19. The AI inference memory device of claim 12, wherein the operations further comprise retrieving each weight in the set of weights from a previous storage location in memory prior to storing the set of weights determined for a layer in a page of memory of the memory arrays;
thereby re-arranging weight data in at least one of the NVM dies.

20. An artificial intelligence (AI) inferencing system, comprising:
a substrate coupling:
an AI inference memory device for storing arrays of weights, the memory device comprising a plurality of non-volatile memory (NVM) dies, each of the NVM dies including at least one memory array and a plurality of connections to corresponding channel logic to provide storage into and retrieval from the memory array; and
a neural processing unit (NPU) implementing an accelerator core connected via the corresponding channel logic for conducting data to and from the memory arrays;
wherein the neural processing unit is configured to implement:
receiving a neural network definition defining a neural network having a plurality of layers, each layer comprising a plurality of neural network nodes, each neural network node using a particular set of weights to compute a node value for the neural network node by applying a function to the particular set of weights and an input to the neural network node during an inferencing operation;
determining for a layer of the plurality of layers defined in the neural network definition, a set of weights to use to compute a neural network inferencing result for each neural network node of the plurality of neural network nodes in the layer; and
storing the set of weights determined for the layer in a page of memory, such that any weights used to compute the neural network inferencing result for each neural network node of the plurality of neural network nodes in the layer are stored together in the page of memory for retrieval together.

21. A non-transitory memory storing instructions for storing weight data used to compute node values during artificial intelligence (AI) inferencing operations conducted by a neural network, which when, executed by one or more processors implement actions including:
receiving a neural network definition defining a neural network having a plurality of layers, each layer comprising a plurality of neural network nodes, each neural network node using one or more weights to compute a result for the neural network node by applying a function to (i) the one or more weights and (ii) an input to the neural network node during an inferencing operation;
determining, for a layer of the plurality of layers defined in the neural network definition, a set of weights to use to compute a neural network inferencing result for each neural network node of the plurality of neural network nodes in the layer; and
storing the set of weights determined for the layer in a page of memory, such that any weights, of the set of weights, used to compute the neural network inferencing result for each neural network node of the plurality of neural network nodes in the layer are stored together in the page of memory for retrieval together.

* * * * *